(12) United States Patent
Chapman et al.

(10) Patent No.: US 6,417,578 B1
(45) Date of Patent: Jul. 9, 2002

(54) POWER-TRANSDUCER/CONVERSION SYSTEM AND RELATED METHODOLOGY

(75) Inventors: Jamie C. Chapman, Boston, MA (US); Jon A. Peterka, Ft. Collins, CO (US)

(73) Assignee: Prime Energy Corporation, Minden, NV (US)

( * ) Notice: Subject to any disclaimer, the term of this patent is extended or adjusted under 35 U.S.C. 154(b) by 0 days.

(21) Appl. No.: 09/334,110

(22) Filed: Jun. 16, 1999

Related U.S. Application Data

(63) Continuation of application No. 08/961,048, filed on Oct. 30, 1997.
(60) Provisional application No. 60/029,387, filed on Oct. 30, 1996.

(51) Int. Cl.[7] .................................................. F03D 9/00
(52) U.S. Cl. ............................. 290/44; 290/43; 290/54; 290/55
(58) Field of Search ............................. 290/42, 43, 53, 290/54, 44

(56) References Cited

U.S. PATENT DOCUMENTS

| | | | |
|---|---|---|---|
| 147,282 A | 2/1874 | Pratt | 290/43 |
| 1,433,995 A | 10/1922 | Fowle | 290/43 |
| 1,502,433 A | 7/1924 | Johanson | 290/43 |
| 1,536,968 A | 5/1925 | Palm | 290/43 |
| 1,766,765 A | 6/1930 | Savonius | 290/43 |
| 1,835,018 A | 12/1931 | Darrieus | 290/43 |
| 4,048,947 A | 9/1977 | Sicard | 290/43 |
| 4,064,403 A | 12/1977 | Miller | 290/43 |
| 4,070,131 A | 1/1978 | Yen | 290/43 |
| 4,105,362 A | 8/1978 | Sforza | 290/43 |
| 4,134,707 A | 1/1979 | Ewers | 290/43 |
| 4,168,439 A | 9/1979 | Palma | 290/43 |
| 4,220,870 A | 9/1980 | Kelly | 290/43 |
| 4,264,278 A | 4/1981 | Weingart | 290/43 |
| 4,285,481 A | 8/1981 | Biscomb | 290/43 |
| 4,415,306 A | * 11/1983 | Cobden | 415/2 A |
| 4,426,192 A | 1/1984 | Chertok et al. | 290/43 |
| 4,449,053 A | 5/1984 | Kutcher | 290/43 |
| 4,452,562 A | 6/1984 | Hsu | 290/43 |
| 4,452,568 A | 6/1984 | Andersson | 290/43 |
| 4,490,093 A | 12/1984 | Chertok et al. | 290/43 |
| 4,494,007 A | 1/1985 | Gaston | 290/43 |
| 4,518,312 A | 5/1985 | Jacobs et al. | 290/43 |
| 4,525,633 A | 6/1985 | Wertheim et al. | 290/43 |

(List continued on next page.)

FOREIGN PATENT DOCUMENTS

| | | |
|---|---|---|
| CA | 2223902 | 11/1999 |
| DE | 3222007 | 12/1973 |
| FR | 745869 | 5/1933 |
| FR | 909378 | 5/1946 |
| FR | 1038090 | 9/1953 |
| FR | 2394689 | 2/1979 |
| GB | 2 123 487 A | 2/1984 |
| JP | 59-126084 | 7/1984 |
| SU | 1231-251 A | 5/1986 |

OTHER PUBLICATIONS

Goldsworthy—Vertical–axis Wind Turbine, Nevada Green Energy Project/Green Power Initiative, Oct. 1999, 2 pp.

*Primary Examiner*—Nicholas Ponomarenko
(74) *Attorney, Agent, or Firm*—Kolisch Hartwell Dickinson McCormack & Heuser

(57) ABSTRACT

A system and method (several variations) for interconverting moving fluid power and electrical power, involving, in one embodiment, an aerodynamic rotor integrated with an electrical rotor without an interconnecting rotating shaft, where the aerodynamic rotor can either take the form of (a) a selected style (several discussed herein) hoop-type rotor or (b) a fan-blade-type rotor, and in another embodiment, a hoop-like aerodynamic rotor coupled directly to the rotor in an electrical generator through a rotating shaft.

51 Claims, 17 Drawing Sheets

U.S. PATENT DOCUMENTS

| | | | |
|---|---|---|---|
| 4,535,252 A | | 8/1985 | Jacobs et al. ............... 290/43 |
| 4,616,298 A | * | 10/1986 | Bolson .................. 362/192 |
| 4,695,736 A | * | 9/1987 | Doman et al. ............ 290/44 |
| 4,700,081 A | | 10/1987 | Kos et al. ................ 290/43 |
| 4,703,189 A | | 10/1987 | DiValentin et al. ........ 290/43 |
| 4,781,523 A | | 11/1988 | Aylor ..................... 290/43 |
| 4,808,074 A | | 2/1989 | South ..................... 290/43 |
| 4,816,696 A | | 3/1989 | Sakayori et al. ............ 290/43 |
| D300,932 S | | 5/1989 | Sikes ..................... 290/43 |
| 4,831,297 A | * | 5/1989 | Taylor et al. .............. 310/87 |
| 4,838,757 A | | 6/1989 | Benesh ................... 290/43 |
| 4,891,744 A | | 1/1990 | Yamamoto et al. ......... 290/43 |
| 4,915,580 A | | 4/1990 | Obidniak ................. 290/43 |
| 4,976,587 A | | 12/1990 | Johnston et al. ........... 290/43 |
| 4,994,684 A | | 2/1991 | Lauw et al. ............... 290/43 |
| 5,040,948 A | | 8/1991 | Harburg .................. 290/43 |
| 5,075,564 A | | 12/1991 | Hickey ................... 290/43 |
| 5,083,039 A | | 1/1992 | Richardson et al. ......... 290/43 |
| 5,083,040 A | | 1/1992 | Whitford et al. ........... 290/43 |
| 5,140,856 A | | 8/1992 | Larsen .................... 290/43 |
| 5,209,650 A | | 5/1993 | Lemieux .................. 290/43 |
| 5,213,470 A | | 5/1993 | Lundquist ................. 290/43 |
| 5,221,186 A | | 6/1993 | Machin ................... 290/43 |
| 5,254,876 A | | 10/1993 | Hickey ................... 290/43 |
| 5,272,378 A | | 12/1993 | Wither ................... 290/43 |
| 5,289,042 A | | 2/1994 | Lis ....................... 290/43 |
| 5,375,324 A | | 12/1994 | Wallace et al. ............ 290/43 |
| 5,405,246 A | | 4/1995 | Goldberg ................. 290/43 |
| 5,425,619 A | | 6/1995 | Aylor .................... 290/43 |
| 5,474,425 A | | 12/1995 | Lawlor ................... 290/43 |
| 5,478,197 A | | 12/1995 | Schatz et al. ............. 290/43 |
| 5,490,645 A | | 2/1996 | Woodhouse |
| 5,494,407 A | | 2/1996 | Benesh |
| 5,499,904 A | | 3/1996 | Wallace et al. |
| 5,506,453 A | | 4/1996 | McCombs |
| 5,591,004 A | * | 1/1997 | Aylor .................... 416/42 |
| 5,632,599 A | | 5/1997 | Townsend |
| 5,696,419 A | | 12/1997 | Rakestraw et al. |
| 5,743,712 A | | 4/1998 | Aylor |
| 5,863,180 A | | 1/1999 | Townsend |
| 5,951,249 A | | 9/1999 | Aylor |

* cited by examiner

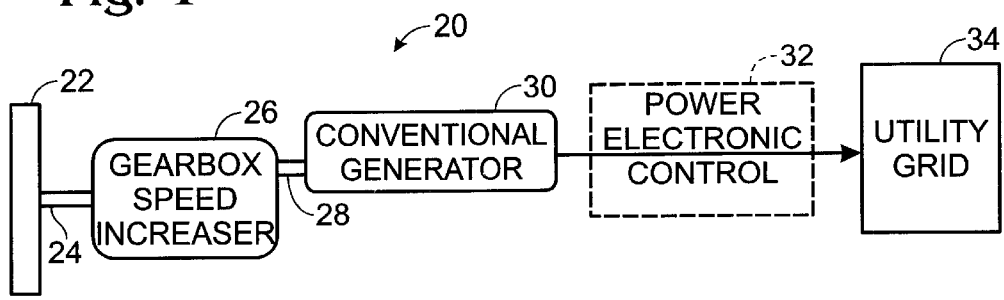
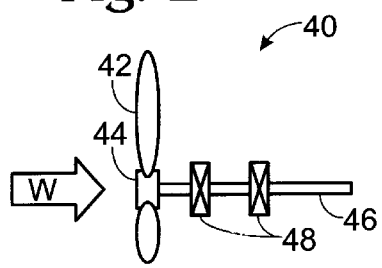 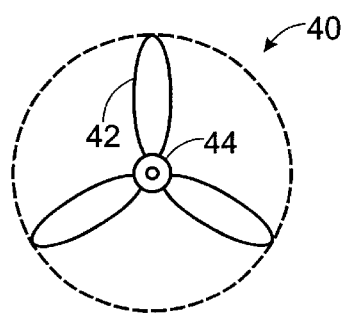
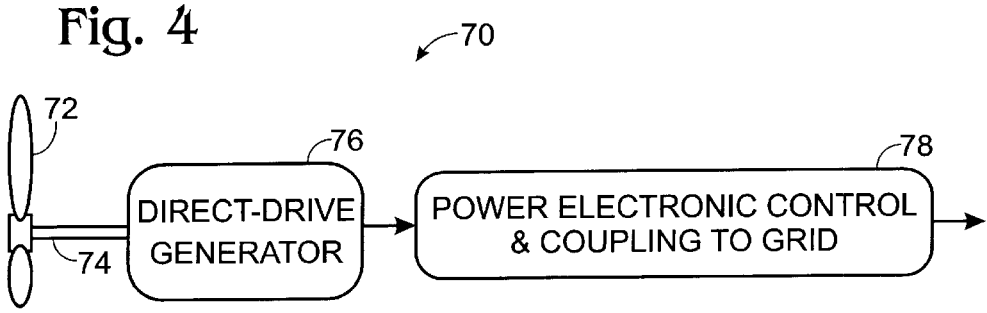

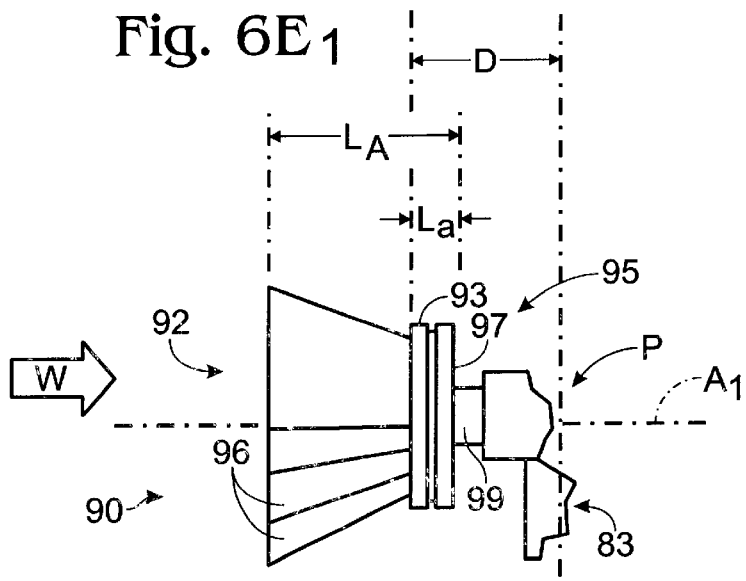
Fig. 6E₁
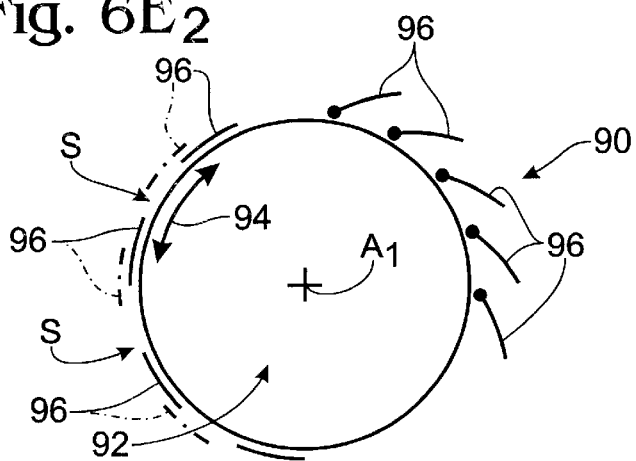
Fig. 6E₂
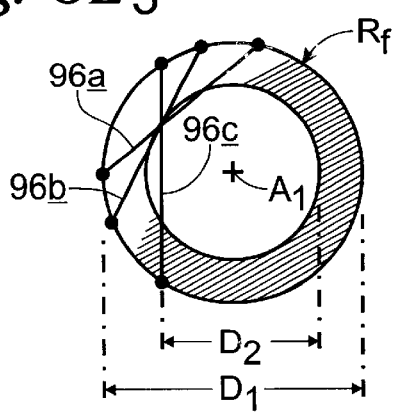
Fig. 6E₃
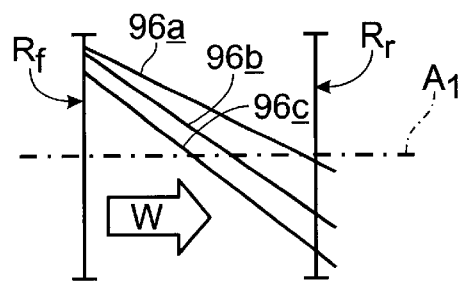
Fig. 6E₄

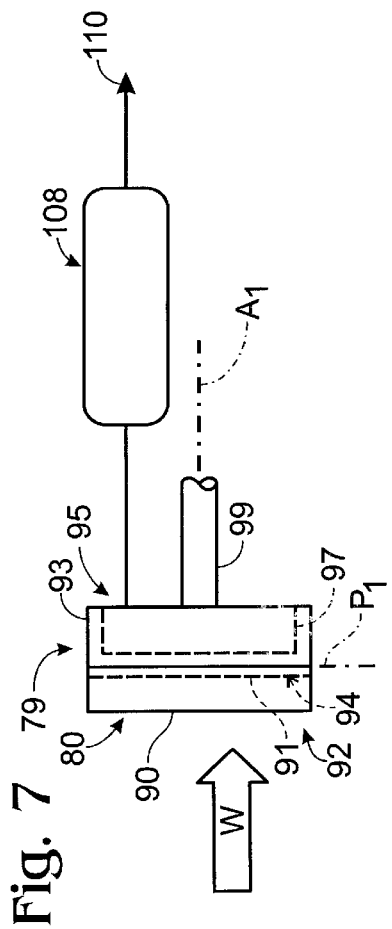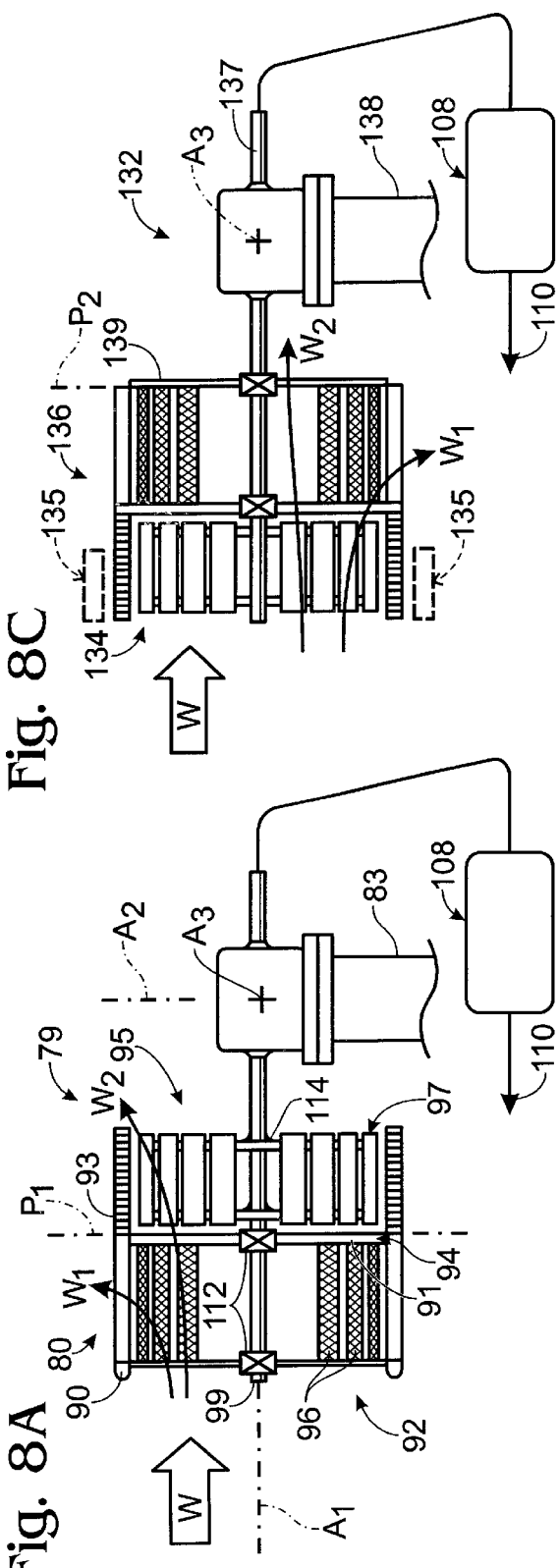
Fig. 8B
Fig. 8C
Fig. 7
Fig. 8A

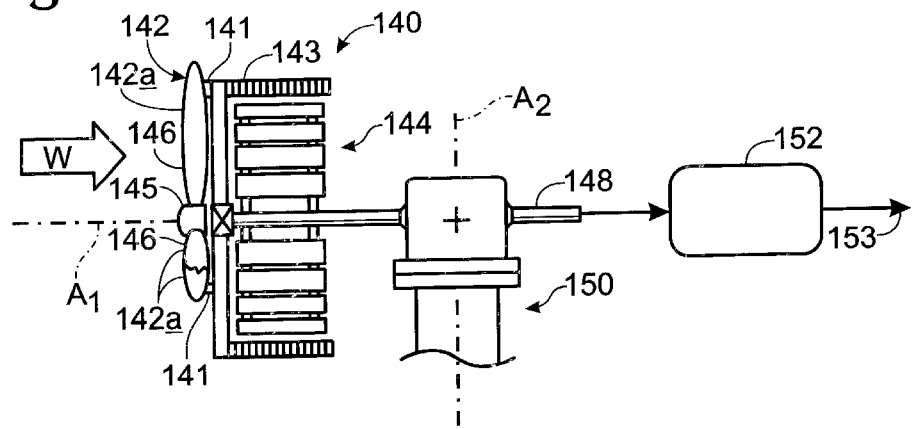
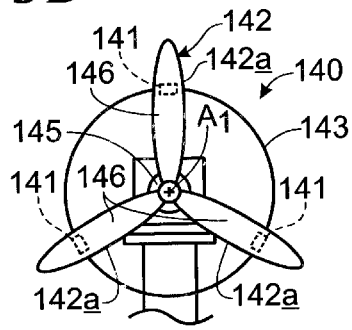
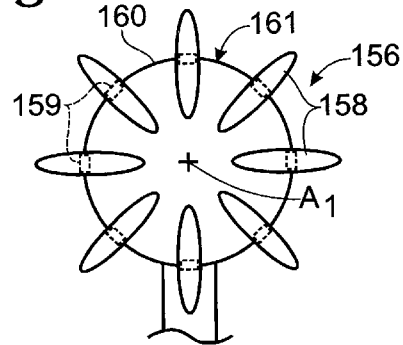
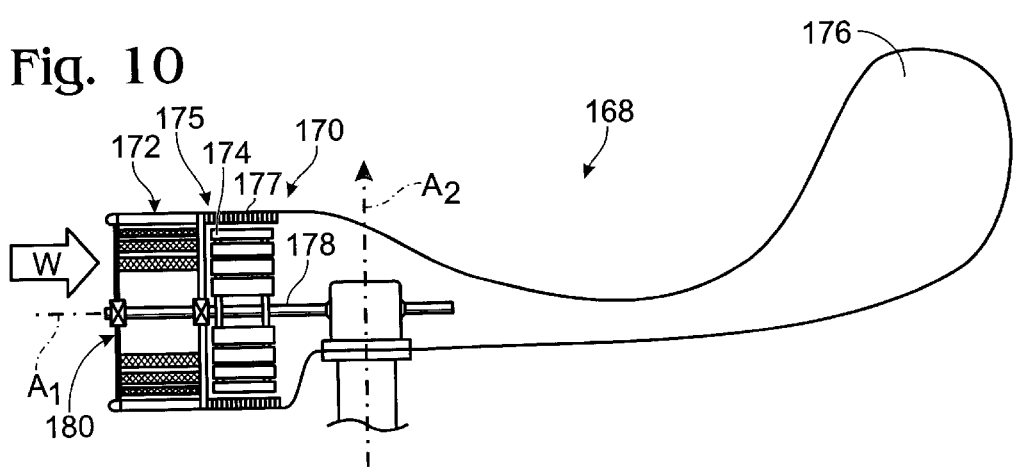

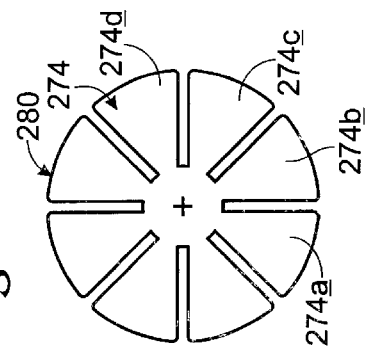
Fig. 17
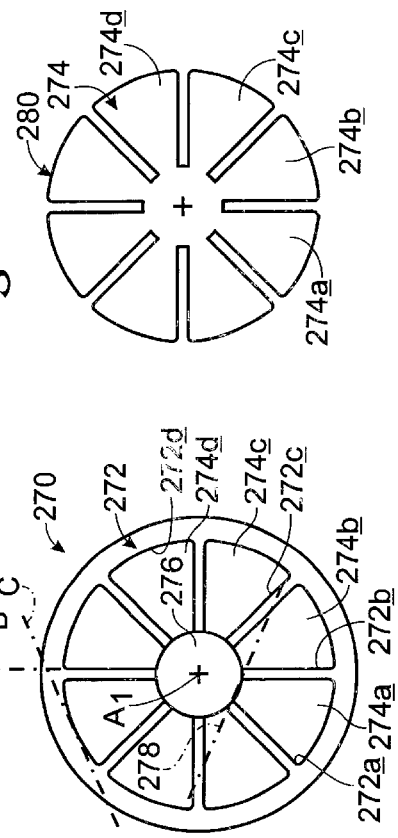
Fig. 16
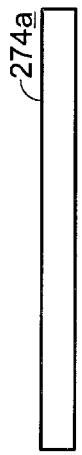
Fig. 18A
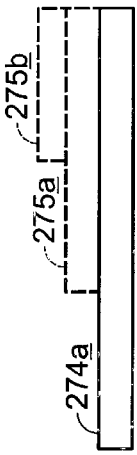
Fig. 18B
Fig. 18C
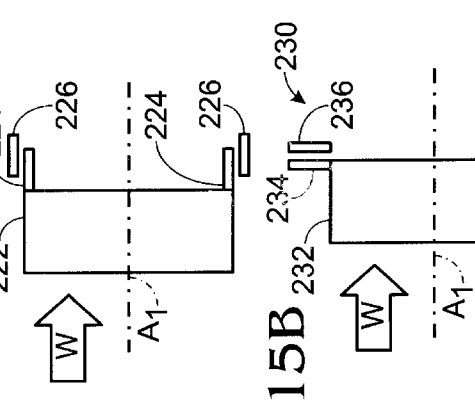
Fig. 15A
Fig. 15B
Fig. 15C

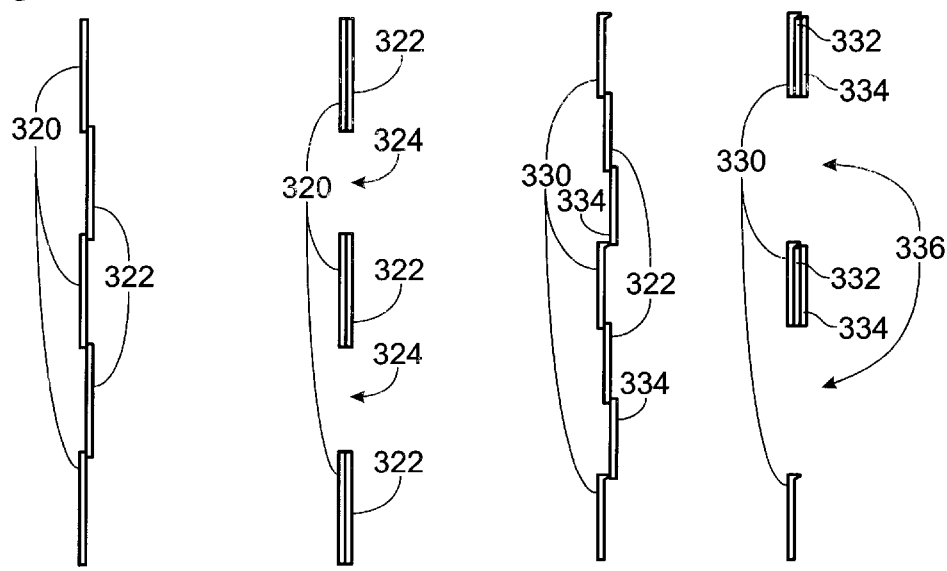

… …

POWER-TRANSDUCER/CONVERSION SYSTEM AND RELATED METHODOLOGY

CROSS-REFERENCES TO RELATED APPLICATIONS

This application claims priority from U.S. Provisional Patent Application Serial No. 60/029,387, filed Oct. 30, 1996 by Jamie Chapman for INTEGRATED ROTOR-GENERATOR FOR THE PRIME WIND TURBINE, the content of which application is hereby incorporated by reference into this document. This application is also a continuation from U.S. patent application Ser. No. 08/961, 048, filed Oct. 30, 1997 by Jamie Chapman and Jon A. Peterka for INTEGRATED ROTOR-GENERATOR.

FIELD, BACKGROUND AND SUMMARY OF THE INVENTION

The present invention involves and discloses several modifications/versions of systems (and related methods) that transduce, or convert, power in a moving fluid (i.e., kinetic, fluid-flow power, such as wind power and water power) to electrical power, or vice versa.

A major field of use for the special features of, and contributions made by, this invention is that field which involves the conversion of wind power to electrical power. Accordingly, and while recognizing that there are several fields particularly suited for use of the present invention, we make a principal description of the invention hereinbelow in the field of wind-to-electrical-power activity. We also discuss briefly below the somewhat broader notion of the conversion of fluid-flow power to electrical power. Thus, a preferred way (and certain variations thereof) for implementing and practicing the system and methodology of this invention is(are) disclosed specifically in relation to wind-turbine, electrical-power generation—a realm of enthusiastic, "alternative-power" activity, wherein the various unique characteristics of the invention have been found to offer particular utility.

Typically, aerodynamic, wind-driven, rotor-operated, electrical generator systems collect and convert variable-speed wind power to electrical power by gathering fluid-motion energy, via an aerodynamic rotor which is positioned in a selected wind path, and by coupling the fluid-flow energy which is extracted and collected by that rotor (and its rotation) to the rotor in an electrical generator. Normally, the resulting electrical power output (typically AC) created by such a system, wherein the aerodynamic rotor is usually a propeller-type (also referred to as a fan-blade-type) rotor, is coupled, ultimately, to a conventional, commercial electrical utility grid which, possessing certain well-known constraints, requires that electrical power delivered to and handled by it have a certain, fairly rigorously maintained "electrical quality". Specifically, such a grid normally imposes a "quality" constraint which requires that "received" power be delivered and maintained, at or very close to, a prescribed AC voltage, and as well, at a prescribed, and quite rigidly anchored, operating frequency (60-Hz is normal).

Accordingly, and to achieve successfully such required "grid constraints", prior art systems typically include a certain, necessary level of structural complexity—complexity which is "operationally disposed" intermediate the contributing aerodynamic rotor and the grid. High on the list of culprits to be dealt with in a system of this type is the fact that power derived from the usual flow of wind is unpredictable, and highly erratic, and also widely variable, because of wind-speed variations. If left unaddressed, such power would not be acceptably deliverable to such a grid.

Thus, and traditionally in many prior art renditions of such a system, there is not a direct-drive condition existing between the wind-driven rotor and the rotor in an electrical generator. Rather, normally interposed (as a connective "chain") the usual, fan-like, aerodynamic rotor and the grid is a speed-increaser gear-box, or the like, which has its input side coupled to the aerodynamic rotor, and its output side coupled to the rotor in a conventional electrical generator (any type). This gear-box serves to make the output operating electrical frequency of the generator relatively close to the grid operating frequency. Additionally, there is usually also often employed an appropriate category of electrical control interface circuit which couples, and which is interposed, the output of the generator and the input structure of the grid. This circuit interface cooperates in helping to furish the grid with the proper electrical-power quality.

Another type of prior art system recognizes that, in certain instances, there are advantages and efficiencies to be gained where there is a direct-drive connection in existence between the usual fan-like aerodynamic rotor and the rotor in an electrical generator. Here too, it is usually normal that the output of such a generator is coupled to a grid via an electrical control interface circuit of the type just mentioned generally above.

In each of these two conventional kinds of systems, the usual derivation of power by a propeller-type aerodynamic rotor, and the delivery of such propeller-derived power via a relatively small-diameter shaft which is connected to such a rotor, introduce inefficiencies and resulting power losses which one would like to overcome. While there are many sources of such inefficiencies and losses, prominent on the list of contributors are shaft-bearing losses, and gear-box loss.

In this prior-art setting, the present invention provides a novel, significantly improved, direct-drive-type, power-conversion (transduction) system, and a related methodology, which offer a number of significant improvements over prior art systems. These important improvements reside typically, inter alia, in the areas of (1) operational efficiency, (2) simplicity of manufacturing, and (3) reduction of system vulnerabilities due to the normal (and occasionally extreme) fluctuations in fluid (wind) velocity.

In the arena of converting fluid-flow power to electrical power, the invention has important applicability especially in relation (a) to fan-like aerodynamic rotors, (b) to hoop-shaped, or squirrel-cage-like (rotary-spool-like), aerodynamic rotors (and rotor sections), and (c) to various hybrids of (a) and (b) which have both squirrel-cage-like and fan-like characteristics. These three general kinds of rotors are also referred to herein, in order to convey a fuller understanding of the technical reach of this invention, as fluid-flow-dynamic, fluid-foil structures. The term "squirrel-cage" is a term with widely known familiarity in the art. These "rotors" are referred to hereinalso, variously, as fluid-responsive assemblies, as fluid-foil substructures, as air-foil assemblies (and spools), as fluid-dynamic rotors and foil assemblies, as wind-responsive portions of revolution structures, as wind-power-responsive units, and as wind-responsive instrumentalities. More about such rotors will follow in the discussion below. As one will observe from a reading of the discussion below, even various conventional rotors can be employed.

Importantly, the invention also has what might be thought of as reverse-performance applications—such applications relating to systems and methods that convert electrical power to fluid-flow power, as, for example, is done with fans, pumps, air-thrust engines, etc.

Accordingly, and referring back to certain earlier discussions herein, there are known in the prior art various power-conversion systems that, for example, transform power which is resident in a flowing fluid (the kinetic-power side of such a system) to (or from, when the reverse-conversion direction is thought about) electrical power (the electrical-power side of such a system). Examples of such systems—i.e., wind-based systems—have been discussed generally above. Analogous systems, of course, are known involving other types of fluids, such as water.

As is somewhat suggested by the discussion areas mentioned above, everpresent goals—goals that are aimed at designing improved, fluid-flow, power-conversion systems—include, inter alia, (1) increasing efficiency, in terms of power yield, (2) achieving maximum design and construction simplicity, and (3) holding system materials, building activities, and installation and maintenance, costs to a minimum. For power-conversion systems that must work well with the derivation of electrical power from a variable fluid-flow velocity, such as is usually present with wind, another critical design objective, certainly, is to develop, and to achieve (commercially successfully), mechanisms that accommodate (by "evenizing") drastic, as well as ever-present-minor, changes in such velocity. How the present invention addresses these matters will become apparent shortly.

Further discussing and elaborating wind-turbine systems which have been in use for many years, limitations in the design and performance of these systems have prevented them from being used more widely than they have been. FIG. 1 provides a schematic illustration of a typical wind-turbine-type, power-conversion system 20. In this system, an aerodynamic, typically fan-type, rotor 22 (illustrated as a simple rectangle in FIG. 1) is connected, via a bearing-supported, rotating shaft 24, to the input side of a speed-increaser gear-box 26. Rotor 22 typically operates at a rotational speed in the range of about 20- to about 300-rpm. Gear-box 26 translates the rotational speed of shaft 24 into a relatively higher rotational speed in an "output" shaft 28, which, in turn, is connected to the rotor in a conventional, electrical generator 30. A power-electronic, interface-control circuit 32 is sometimes (suggested by the dashed lines) used to control the generator (for example, rotor speed and shaft torque), and also to convert the generator's variable-voltage, variable-frequency power to a standard utility voltage and frequency (the previously mentioned grid constraints). A conventional utility grid 34 receives output power from the generator and the interface-control circuit.

Rotor 22, as has been mentioned, is usually a propeller-type rotor, such as rotor 40 seen in FIGS. 2 and 3. In this rotor, plural blades 42 drivingly connect with, and extend radially outwardly from, a central hub 44. Hub 44 is connected to one end of a relatively-small-diameter shaft 46, which is supported by bearings, such as bearings 48, and which rotates with hub 44, and blades 42, in response to naturally incident wind W impinging on the blades. FIG. 3 shows a front view of rotor 40, which rotor optimally receives wind from a direction normal to, and into the plane of, this figure.

Other types of aerodynamic rotors have been used somewhat in the past. For example, another type of such a rotor is a generally cylindrical "squirrel-cage" or "hoop-type" rotor, such as the ones disclosed in U.S. Pat. Nos. 4,781,523, 5,425,619, 5,632,599 and 5,743,712 each of which patents is incorporated by reference into this document. Squirrel-cage rotors, which have not heretofore been directly linked to a direct-drive-type electrical generator, typically employ a hoop-shaped ring structure (a hoop member) which rotates around a horizontal central axis that is generally parallel to the direction of wind travel (usually nominally, generally parallel to the underlying "ground plane"). Such ring structure typically has peripherally, circumferentially and generally cylindrically arranged elongate air foils that direct air flow from the interior of the overall ring structure radially outwardly to the exterior, thereby causing the whole structure to rotate around the central axis. The mentioned air foils are typically disposed with their long axes substantially paralleling the central rotational axis. Squirrel-cage rotors often require what is referred to as a back panel structure which functions to direct oncoming wind through the usual, and necessary, air-flow spaces provided between the included circumferential air foils. A potential problem with such "back-panel" squirrel-cage rotors becomes very evident under circumstances where wind velocity spikes to a level that "overpowers" (i.e., laterally overloads) the back panel and/or the underlying ground-support structure—an event which can result in a catastrophic and destructive failure of the squirrel-cage system (rotor structure, support structure, etc.)

Another "ready-for-improvement" issue involving various conventional power-conversion systems of the type now generally being discussed involves, in effect, "matching" the wind-flow-determined, operating, rotational speed of an aerodynamic rotor appropriately with the most appropriate rotational speed of the rotor in an electrical generator. Normally, such matching requires that a mechanical "speed-increaser" be employed intermediate the aerodynamic rotor and the generator rotor.

There are two common types of speed-increasers that are used typically in wind turbines—a gear-box, and a belt-and-pulley, transmission. Reinforcing a bit what was just above said about speed matching, a speed-increaser is required because of a mismatch between the optimally-efficient operating speed of the aerodynamic rotor and that of the electrical generator. The most efficient conversion (i.e. wind-flow-to-rotation) speeds of most aerodynamic rotors are much lower than the optimally-efficient rotational speeds of standard industrial electrical machines, such as squirrel-cage induction or synchronous generators (four-pole or six-pole). These machines are designed for relatively high-speed, low-torque operation. For example, the standard four-pole induction or synchronous machine generates at 60-Hz electrical power at a nominal rotor rotational speed of 1800-rpm. In contrast, and depending on the performance power level and size of the aerodynamic rotor operating in air, the aerodynamic rotor may have a typical operating speed in the range of about 20- to about 300-rpm. Depending on the wind-speed regime, the 20-rpm speed may apply to aerodynamic rotors designed to deliver about 600-kW to about 1500-kW of mechanical, rotating-shaft power. Similarly, the 300-rpm speed might apply to much smaller rotors designed to deliver about 2-kW to about 10-kW of rotating-shaft. Use of a speed-increaser significantly increases: (a) the number of required parts in a system; (b) the cost of manufacturing; (c) the design complexity; (d) the expected requirements and related costs for routine maintenance; and (e) the potential for mechanical failure. Use of a speed-increaser also results in a reduction of power-conversion efficiency.

Wind turbines that employ propeller-type rotors have been manufactured which do not require speed-increasers to translate shaft rotational speed between an aerodynamic rotor and a generator. Such systems are referred to as "direct-drive" wind turbines. For example, and as is shown in FIG. 4, another conventional, prior art power-conversion system 70 employs a propeller-type aerodynamic rotor 72. Rotor 72 is connected, via a rotary shaft 74, to the rotor in a direct-drive generator 76. Shaft 74 rotates with rotor 72. Shaft 74 is supported by suitably located bearings (not shown). Power-conversion system 70 is classifiable, generally, as a variable-speed configuration, which configuration employs appropriate, conventional power-electronic, interface-control circuitry 78 to control "electrical operation" of the generator (as well as other things such as the speed and torque matters mentioned earlier), and as a part of that control, to convert the generator's variable-voltage, variable-frequency power to a standard utility grid-quality voltage and frequency.

One significant problem with prior wind-turbine systems, such as system 70 in FIG. 4, is that all rotational energy from the usual fan-like, aerodynamic rotor is transferred ultimately to the associated generator rotor through a shaft, like shaft 74. Thus, and as a natural result of this kind of "power-transfer" construction, such a shaft is subjected to fluctuating bending moments that increase fatigue and the probability of mechanical failure. Also, cyclic loading and unloading of such a shaft drains, and thus creates undeliverable, output power.

Thus, an important object of the present invention is to provide a unique, simple, easily manufacturable and efficiently operable, power-conversion system (and related methodology) for interconverting (potentially bidirectionally) moving-fluid-power and electrical power. The system of this invention is also referred to herein as a wind-power-deriving, electrical power generator system, and additionally, as an apparatus for converting kinetic, fluid-flow power to electrical power.

As will be more fully developed below, several structural, wind-power-to-electrical-power embodiments of the invention are proposed, illustrated and discussed herein. Each of these embodiments features a direct-drive system, and a related methodology, which are based upon the presence of a direct-drive coupling between an aerodynamic, fluid-power-acquisition rotor and the electromagnetic-generator rotor in an electrical generator. Such a generator rotor is also called herein a mechanical-rotation-responsive instrumentality. The required, associated generator stator is also referred to as a rotary-magnetic-energy-responsive instrumentality. Collectively, these two components (generator rotor and stator) are referred to as an electrical-power-generating assembly, as an electromagnetic (or electrical) generator assembly, and as a direct-drive generator (or generator section). In certain specific embodiments of the present invention, the electrical generator employed has a generally cylindrical configuration, with either the rotor or the stator functionally nested within the other one of these two components. In other embodiments, the generator has a generally pancake-like configuration, with the rotor and the stator functionally facing one another in the manner of two axially-stacked, relatively thin circular disks.

Each embodiment of the system of this invention also features an electronic interface circuit (or power-electronic control structure). This interface circuit (which could be either AC or DC in "nature") includes input and output sides connected, respectively, to the generator and to the final system-electrical-power-output which can be connected to a conventional, commercial power grid.

The most preferred embodiment employs a hoop-like aerodynamic rotor coupled, without the presence of any intervening rotary shaft, directly to the rotor in an electrical generator. The aerodynamic rotor and the electrical generator rotor are also spoken of herein collectively as a unitary revolution structure, and as a barrel-shaped, power-conversion device.

Another embodiment utilizes a fan-type aerodynamic rotor, also coupled, without there being any intervening rotary shaft, directly to such a generator rotor.

A third embodiment does employ a rotary power-transmission shaft, with a hoop-like aerodynamic rotor coupled directly through this shaft to the rotor in an electrical generator.

Still other embodiments have hybrid fan-like and hoop-like qualities.

Each such specifically shown and discussed embodiment of the present invention offers advantages, like those mentioned generally above, over known prior art systems. The embodiment which appears to offer the fullest level of advantage, and the one which is, accordingly, referred to herein as the most preferred embodiment, is a "hoop-rotor", "rotary shaftless" embodiment.

Accordingly, one specific object of the present invention, thinking of the same in one, unidirectional, power-conversion sense, is to provide a novel system which functions to convert fluctuating wind power efficiently into electrical power—especially, into grid-quality (or other regulated and controlled) electrical power.

Another object of the invention is to provide a wind-turbine system which does not require a speed-increaser to couple torque and power from an aerodynamic rotor to an electrical machine—i.e., a direct-drive kind of system.

A further object, one which is related to that just stated immediately above, is to provide a system of the type generally described, wherein fluid-power is extracted and acquired by the system in what, according to one preferred embodiment, can be visualized as an axially elongate, annular, hollow-cylindrical zone, or region, of space and manner, and then is conveyed, by way of mechanical rotation, also in an annular, hollow-cylindrical space/ manner, and via what is referred to herein as a hollow, annular, cylindrical zone of rotating magnetic power, directly to a rotor in an electrical generator. Most preferably, perimetral, rim-to-rim coupling between (a) the perimetral rim structure in the aerodynamic portion of the rotating structure (which collects wind-power), and (b) the perimetral rim structure in the portion of the rotating structure (which works in conjunction with an electrical generator stator), effectively transfers all rotating power between these two rim structures without the presence of any intervening, small-diameter rotating shaft which, in accordance with prior art structures, becomes loaded with substantial cyclical, fatiguing, power-compromising torque. As has been mentioned earlier, a preferred system construction which employs this "rim-to-rim" approach utilizes a hoop-, or squirrel-cage-like, aerodynamic rotor coupled directly to the rotor in an electrical generator. The aerodynamic rotor has a perimetral air-foil structure including aerodynamic vanes, or air foils (surface structure), which are spaced circumferentially to accommodate the radial passage of wind. The preferred unitary aerodynamic rotor and the generator rotor are referred to as being elongate, and as having a common, long, rotational (coincident) axis.

By way of an important ancillary comment at this point, and while keeping this particular, "preferred-embodiment" approach specifically in mind (vis-a-vis the reference made to cylindricality), it is important to recognize, and to register the fact, that the present invention places a somewhat broader uniqueness-footprint in the sands of innovation. More specifically, if one simply substitutes (in a thinking sense) the term—surface-of-revolution—(and the like) for the term "cylindrical" (used immediately above, and elsewhere herein) in reference to the acts of power-acquisition, power-conveyance and power-transfer, one will appreciate the general measure of this "footprint". Cylindricality, the preferred configuration dwelt upon principally herein, yields comfortably, where desired and appropriate, to other configurations, such as conicality, bowed-convex-/concavality, and so on.

In addition to, and separate from, the advantages offered (in certain invention modifications) by a rotary shaftless driving interconnection between an aerodynamic rotor and a generator rotor, one further important contribution of certain other implementations of the system and methodology of the present invention is the direct linking of a hoop-type aerodynamic rotor with the rotor in an electrical generator, regardless of whether or not any intervening rotary drive shaft is used. The direct-drive combination of such a hoop-type rotor and generator rotor, even in the presence of an intercoupling rotary shaft, has been found (in some instances) to be desirable, and an advance over prior art approaches.

Still another important object of the invention, in certain ones of its proposed configurations, is to employ a fixed (anchored), stationary shaft, and on that shaft, a support bearing structure (journal mechanism) for an aerodynamic rotor, which configuration minimizes to the point of substantially eliminating the fluctuating bending moments that always inescapably occur when a rotating shaft is used.

A further object is to provide a wind-turbine design that adapts to fluctuating wind velocity, and that minimizes the risk of failure at exceptionally high incident wind speeds.

In the context of pointing out various features and objects of the most preferred embodiment of the present invention, perhaps an important way of summarizing and characterizing an underpinning and key feature of this invention, which feature results in its offering substantial improvements over related, prior art, power-conversion systems and methods, and expressing this feature with reference to that which (above) has been characterized as the most preferred embodiment of the invention, is to focus on the fact that that applicant's system and related methodology preferentially employ(s) direct, rotary shaftless coupling between a rotary, hoop-type air-foil and the rotor in an electrical generator. During operation of this system, these two rotors, along with the just-mentioned rotary shaftless coupling structure, rotate along with one another within a path, region or zone which is referred to herein as being described by, or as describing, a generally cylindrical locus.

On a somewhat broader plane, and talking now briefly here about a way of viewing the energy- and power-handling characteristics of this invention, and, further, doing this in the setting of one of its primary, current fields of application—the field of converting wind-power into electrical power—the invention employs an aerodynamic rotor which effectively: (a) "collects", on the kinetic-power side of the system, fluid-derivable (fluid-flow) power that exists in a given cross-sectional area of a flow of incident wind; and (b) extracts such energy/power from this flow at the perimeter of a rotating structure. This rotor then directly conveys captured and extracted power, in the form of mechanical rotation (or rotary mechanical power), and in a hollow, perimetral, rim-to-rim, rotating annular fashion (or connection), into the periphery of a rotor in an electrical generator. The electrical generator, on the electrical-power side of the system, converts such rotary power to electrical power.

This power-handling and conversion protocol, so-to-speak, accurately depicts two of the three, principal, general realizations of the invention described herein.

In the third general realization of the invention, a realization wherein a rotary power-transmission shaft is used as a "conveying" mechanism, energy capture and extraction is, nevertheless, and according to the present invention, performed in substantially exactly the same "rotating annular region" manner.

In those system embodiments of the present invention which avoid the use of an intermediary rotating shaft as a mechanism for effecting power transfer to an electrical generator, such avoidance: not only (a) simplifies and makes less costly the construction of applicant's system, when such is compared to the normal complexity and cost-of-manufacture associated with prior art systems; but also (b) removes from the "power-transfer environment" conventional, intermediate structure which would, were it present, introduce energy-losing, fatigue-inducing, cyclical bending moments and torques during the process of power transfer. Such commonly experienced cyclic loading extracts a certain amount of available energy which could otherwise be transferred, and it also diminishes the useful operational life of the rotating mechanical components of a system. The elimination of such prior art power-transfer structure, therefore, leads to a significant improvement in the efficiency of energy transfer between the environment of fluid-flow-power and the environment of electrical power. It also promotes increased, useful life of a system.

Important advantages and efficiencies, as mentioned earlier herein, have also been noted in another form of the invention, wherein a hoop-type aerodynamic rotor to couples power directly into the rotor in an electrical generator, regardless of whether or not such coupling takes place through a rotary shaft.

By connecting what can be thought of as the electrical output side of such an electrical generator to the input side of an appropriate power-electronic control structure, that control structure (which is offered as a component of the present invention) can be operated easily and effectively (at its output side) to eliminate telegraphing to the electrical (grid) side of the system fluctuations which would otherwise be introduced (by virtue of the fact that fluid-flow power, such as wind power, may be widely variable over time).

An additional and important benefit of eliminating (in one general approach offered by the invention) a power-transfer environment which includes a rotating shaft, is that the structure (which may be stationary, and elongate-shaft-like, in nature) that supports the rotating components of applicant's system is not subjected to ever rotationally-changing, fatiguing, variable bending moments.

In the most preferred system implementation of the present invention, referred to hereinalso as a cup-shaped apparatus, the structure therein which rotates (as, for example, under the influence of impinging wind) can be thought of as including (on the aerodynamic side of the system) a rotary, elongate, cup-wall structure. This cup-wall structure includes: (a) a generally open-ended air-foil-rotor-wall-portion at the system's wind-receiving front end; and (b) an electrical-generator-rotor-wall-portion, which forms part of the generator employed in the system. The generator's stator is located operationally adjacent the generatorrotor-wall-portion (either within, next to, or circumsurrounding the mentioned generator-rotor-wall-portion), and is also talked about herein as being an end-wall, electrical-generator stator structure. The rotational components of the system rotate on and about a common longitudinal rotational axis, which axis nominally substantially parallels the plane of the underlying ground where the structural rendition of the invention is installed for use.

In such a system, the non-wind-receiving end of the rotary portion of the system is effectively normally closed to the through-flow of air. The "closure" structure preferably includes what is referred to herein as a change-configuration, infinitely adjustable, back door structure—also referred to herein as a wind-barrier structure, and as a back door assembly. This part of the system includes change-position door structure that has selectively openable and closeable openings in the form of openable and closeable doors, or door expanses. The openness and/or closedness of these openings is adjusted, typically, directly under the influence of impinging wind activity, and is used to promote an operational behavior which allows the system to capture, and to use, as much wind-derivable power as possible, while at the same time dealing effectively with possible damaging wind overload conditions. In particular, this back door structure, under circumstances of overly high-velocity winds, opens appropriately to allow a certain amount of impinging wind effectively to escape the system without damagingly loading it. Various specific kinds of back door arrangements are described and illustrated herein.

One very interesting and promising modification of the present invention is one which includes a fluid-flow rotor, wherein positionally adjustable fluid-flow foils (the aerodynamic foils in an air-flow system) are disposed effectively in attack-angle "planes" that are disposed at oblique angles relative to the rotor's axis of rotation. Such foils can be employed both to capture fluid-flow power in order to impart rotation to the associated rotor, and as well, simultaneously, to act as a kind of back-panel, or back-door, arrangement. Selective (and preferably infinitely changeable) attitude adjustments made in these foils—made either automatically in response to sensed changes in incident fluid-flow activity, or "manually" in response to the intentions of an operator—can change simultaneously how the rotor extracts (or bypasses) incident fluid-flow power.

A "close cousin" to this kind of embodiment is one wherein foil-positioning adjustability is omitted.

These just-mentioned two modified forms of the invention are ones which lend themselves particularly well to the employment of a fluid-flow rotor which has the previously mentioned configurational "aspects" of conicality, bowed-convex-/concavality, etc.

A further very important concept to note as one now proceeds (as a student of the relevant art) investigatively into the descriptive material which shortly follows, is that the present invention weaves a potent strand of striking and fresh elegance into the developing structural fabric of fluid-flow-to-electrical power conversion. It does so by introducing, in the technical equivalent of a single artistic stroke, the ability to support (according to several important modifications of the invention) all required rotating elements, without the presence of a rotating shaft, via a direct support connection which is completely to one axial, "outboard" side of the whole combinational assembly of those elements. Combining additionally (with this significant configurational advance) employment in the whole combination of a relatively, axially, very thin electrical generator, as is described below, such combining anchors, for all skilled in the art, an immediate recognition of the engineering simplicity and sensibility of eliminating (under many if not most circumstances) a rotating connective shaft, and further of reducing, to an extraordinary level of structural minimization, the componentry required to support the rotating "fluid-flow" portions of a system above the ground. In certain instances, the various electrical circuit components which make up a control interface circuit, like the kind generally identified above, can be built directly into the structure of the generator. This constructional opportunity further enhances system compactness.

Other important objects and advantages that are offered by the present invention will become apparent as the description which now follows is read in conjunction with the accompanying drawings.

DESCRIPTION OF THE DRAWINGS

FIG. 1, (mentioned briefly earlier) is a simplified, schematic/block diagram illustrating components of one type of conventional, wind-turbine, electrical power-generating system.

FIGS. 2 and 3 (also mentioned earlier) show schematic, isolated, simplified, side and front views, respectively, of a conventional, propeller-type (fan-type), aerodynamic rotor isolated from other components in a conventional system.

FIG. 4 (mentioned above) is a simplified, schematic/block diagram of a conventional wind-turbine, electrical power-generating system employing a direct-drive-type generator.

FIG. 5B also illustrates, generally, the basic cooperative components of an overall rotary-component support structure, including (a) a substantially vertical support post which furnishes what is referred to herein as an axially outboard direct supportive connection to and for the rotary structure, (b) a generally horizontal, elongate, stationary shaft anchored near the top of this post, and (c) appropriate bearings, or journal mechanism, which mount(s) the system's rotary components on this shaft.

Figure 6A:
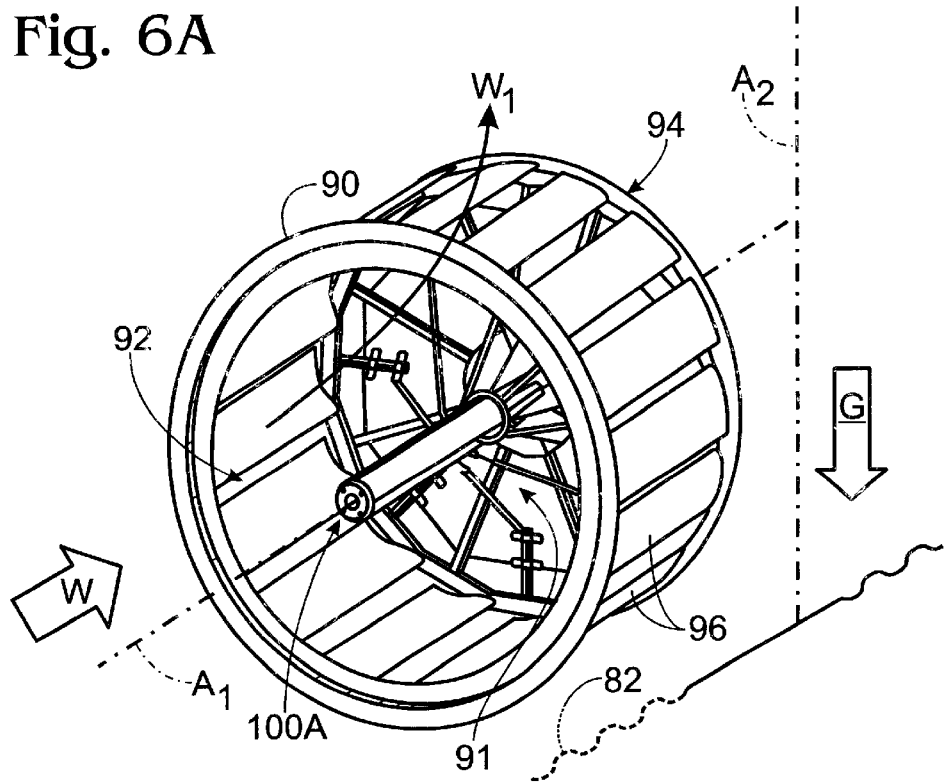
FIG. 6A is an isolated (i.e., without any attached electrical generator components, or physical mechanical support structure) perspective view of a peripheral-air-foil-including and back-door-structure-employing, "squirrel-cage", or "hoop-type", aerodynamic rotor.
Figure 6B:
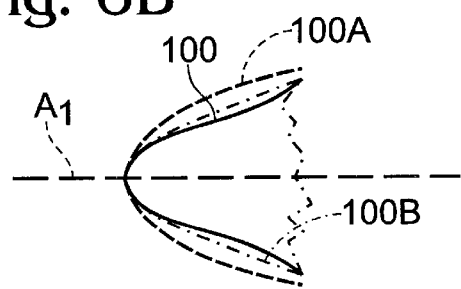
FIG. 6B illustrates, in a simplified, fragmentary side elevation, an aerodynamic cone, which can be employed on an axial central portion (the wind-facing side) of the rotor shown in FIG. 6A.
Figure 6C:
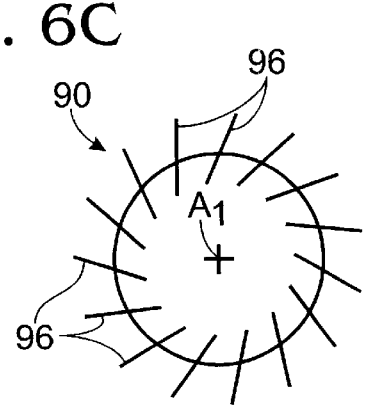
FIGS. 6C and 6D provide very simplified, and very schematic, axial views of a rotor like that pictured in FIG.
Figure 6D:
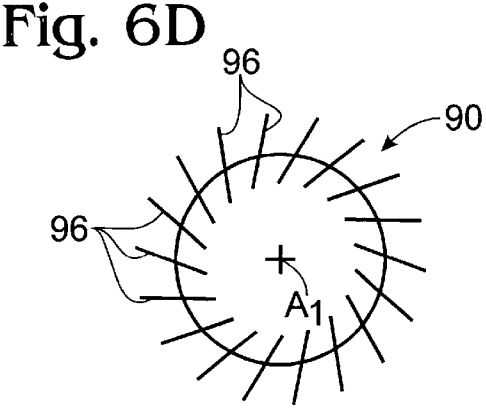

6A, with FIG. 6C depicting such a rotor which employs sixteen air foils, or vanes, and with FIG. 6D showing such a rotor which employs eighteen air foils, or vanes.

FIG. $6E_1$ is a simplified, fragmentary side elevation of a modified form of the invention illustrating a rotary structural arrangement which includes a generally truncated, frustro-conical, squirrel-cage-like, and also somewhat fan-like, hybrid aerodynamic rotor coupled (without the presence of any interconnecting, rotary shaft) to the rotor in an axially, very-thin, pancake-like electrical generator. In the aerodynamic rotor which is pictured here, air-foil vanes are provided which offer dual functionality in that they function both as (1) devices for capturing and extracting air-flow power, and (2) devices for providing back-door wind-pressure relief.

FIG. $6E_2$, a fragmentary axial view taken generally from the left side of FIG. $6E_1$, carries a divided exposition responsibility in this specification, with its respective left and right sides schematically illustrating two different articulation mountings provided for air-foil vanes, which mountings permit the vanes to function simultaneously for wind-flow power extraction, and for wind-flow, "back-door", bypass control.

FIG. $6E_3$ is a stylized, schematic drawing which furnishes an axial view of another type of squirrel-cage-like, and also fan-like, hybrid aerodynamic rotor built in accordance with the present invention.

FIG. $6E_4$ is a stylized, schematic drawing taken generally (and very fragmentarily) from the right side of FIG. $6E_3$.

In FIGS. $6E_3$ and $6E_4$, certain "angular" features of elongate air foils illustrated there are highly exaggerated, as will be explained below.

FIG. 7 is a simplified, schematic illustration of certain features of an integrated rotor-generator system made in accordance with the present invention.

FIG. 8A is a simplified, fragmentary, isolated, schematic/block side view, employing somewhat greater detail than that used in FIG. 7, of an integrated rotor-generator system made according to the invention.

FIG. 8B shows a front view of the system shown in FIG. 8A.

FIG. 8C, which is very much like FIG. 8A, shows a simplified, fragmentary, isolated, schematic/block side view of an integrated rotor-generator system constructed in accordance with one alternative embodiment of the invention.

FIG. 9A shows a simplified, fragmentary, schematic/block side view of one modified system embodiment of the invention, which embodiment employs an integrated rotor-generator that contains a propeller-type (fan-blade-type) aerodynamic rotor.

FIG. 9B shows a front view of the system pictured in FIG. 9A.

FIG. 9C is a front view of another integrated rotor-generator system embodiment of the invention, which embodiment also contains a propeller-type aerodynamic rotor.

FIG. 10 is a simplified, fragmentary, isolated, schematic side view of portions of an integrated rotor-generator system which includes a wind vane for directing the aerodynamic rotor (a squirrel-cage-type is shown) toward oncoming wind.

Figure 11:
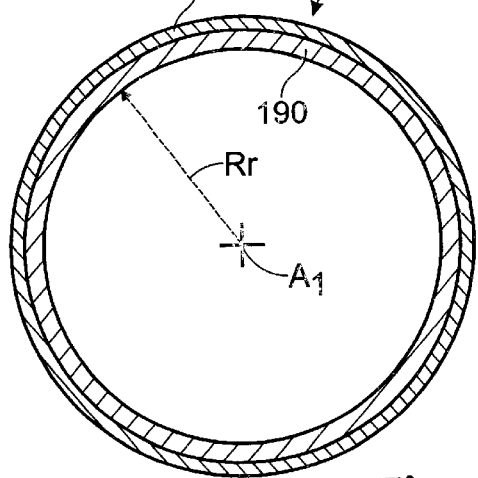

FIG. 11 is a partial sectional view of an electric rotor employed in one embodiment of the present invention.

Figure 12:
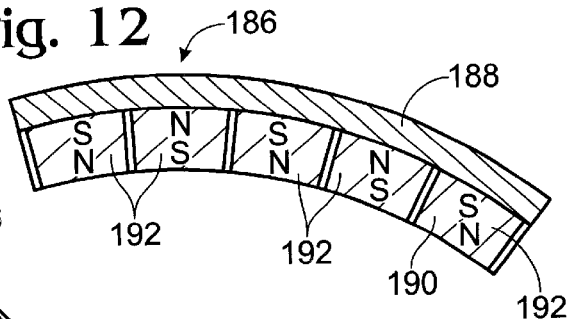

FIG. 12 is an enlarged partial view of the rotor shown in FIG. 11.

Figure 14:
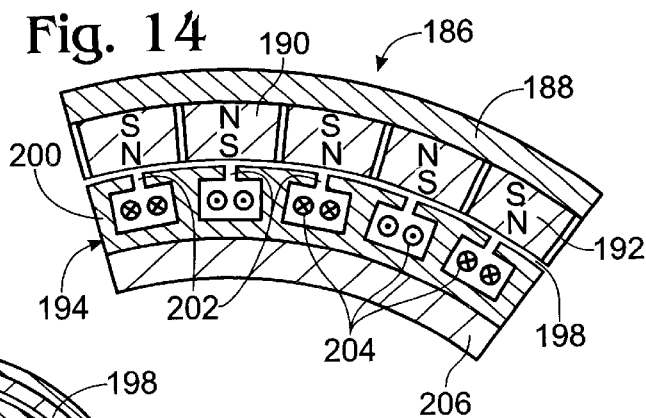
Figure 13:
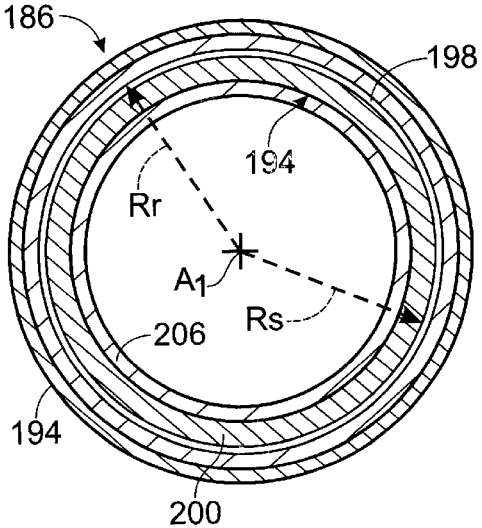

FIGS. 13 and 14 are partial sectional views of a preferred electrical rotor and stator configuration employed in one embodiment of the present invention.

FIGS. 15A–15C are simplified, schematic side views of integrated rotor-generators employing alternative electrical rotor and stator configurations in accordance with the present invention.

FIG. 16 is a simplified, front view of a back door system in a hoop-type aerodynamic rotor in accordance with a preferred embodiment of the invention.

FIG. 17 is a simplified, isolated, front view of a single-piece array of back door elements employed in the system illustrated in FIG. 16.

FIG. 18A shows a simplified, partial, cross-sectional side view through a back door element in the system illustrated in FIG. 16.

FIGS. 18B and 18C are partial, cross-sectional side views of alternate back door elements.

Figure 19:
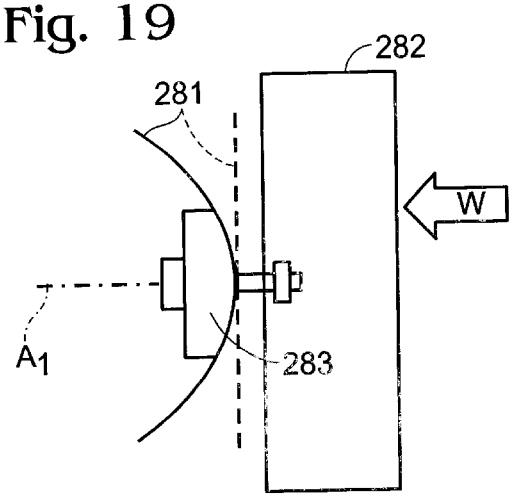

FIG. 19 is a simplified, schematic side view of the back door system illustrated in FIG. 16 reacting to wind force (coming from the right side of this figure).

Figure 20:
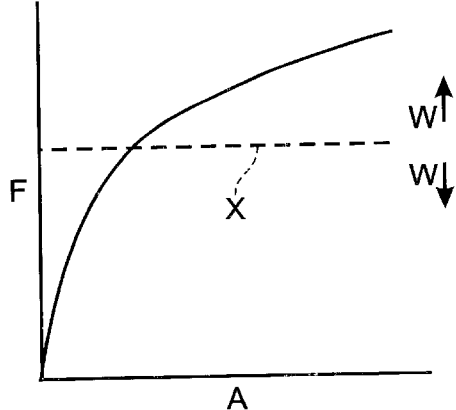

FIG. 20 is a graph showing the relationship, generally, between the extent of back door opening as a function of wind force.

Figure 21A:
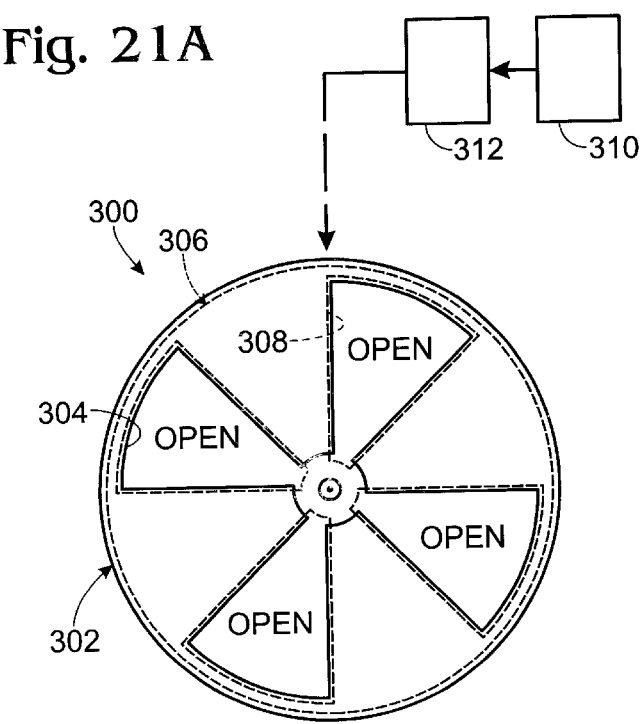

FIG. 21A is a schematic/block-diagram view of a back door system employing sliding screens in accordance with alternative embodiments of the present invention.

Figure 21B:
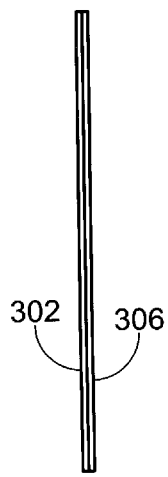

FIG. 21B is a side view of the back door structure used in the back door system shown in FIG. 21A.

FIGS. 22A and 22B are simplified, schematic, side views of a two-layer, sliding-screen, back door system illustrated in closed and opened conditions, respectively.

FIGS. 23A and 23B are simplified, schematic, side views of a three-layer, sliding-screen, back door system illustrated in closed and opened conditions, respectively.

Figure 24:
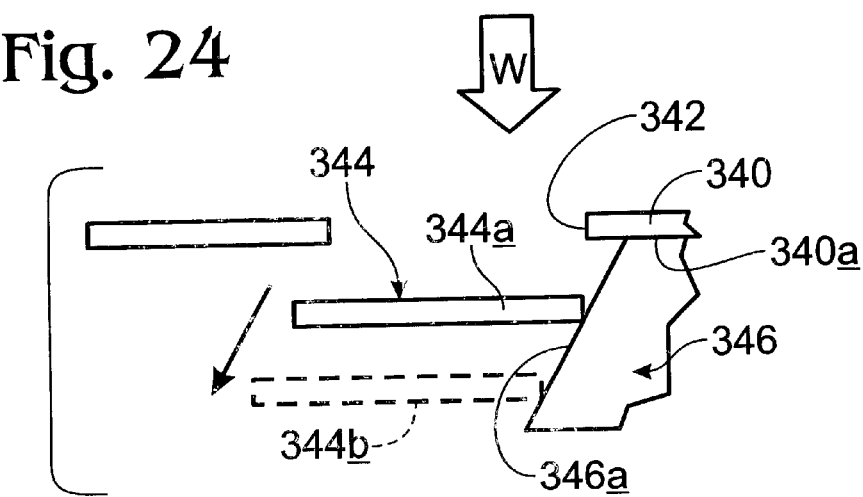

FIG. 24 is a simplified, partial, cross-sectional view of a passive, sliding-screen, back door system (different door-opening conditions being shown in dashed and solid lines respectively) according to an alternative embodiment of the present invention.

Figure 25:
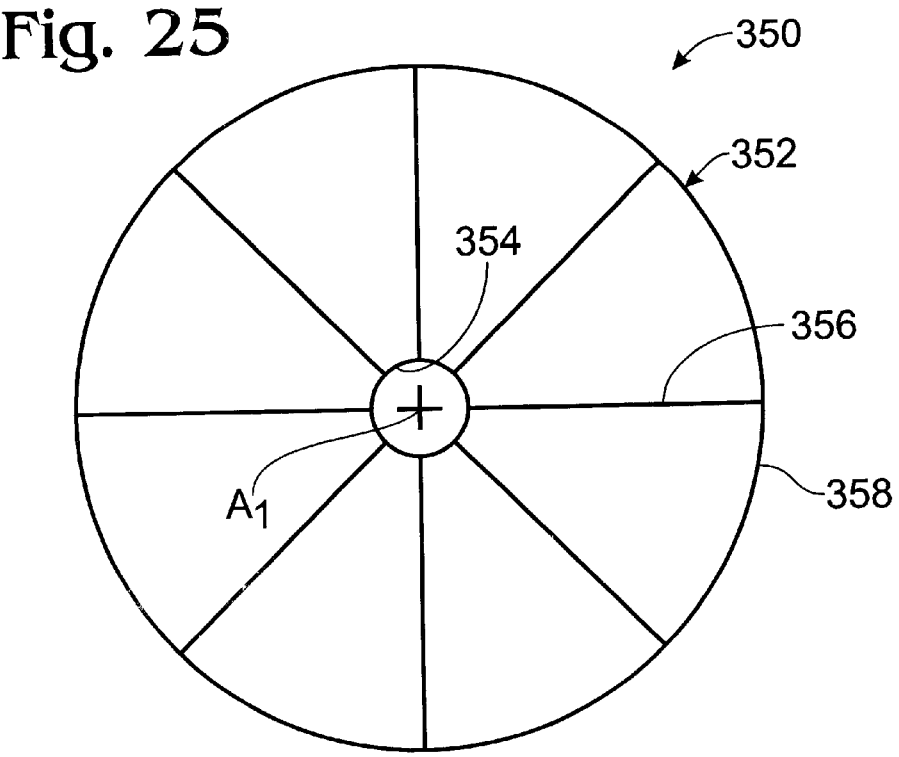

FIG. 25 is a simplified front view of another back door system used in a hoop-type aerodynamic rotor in accordance with the present invention.

Figure 26:
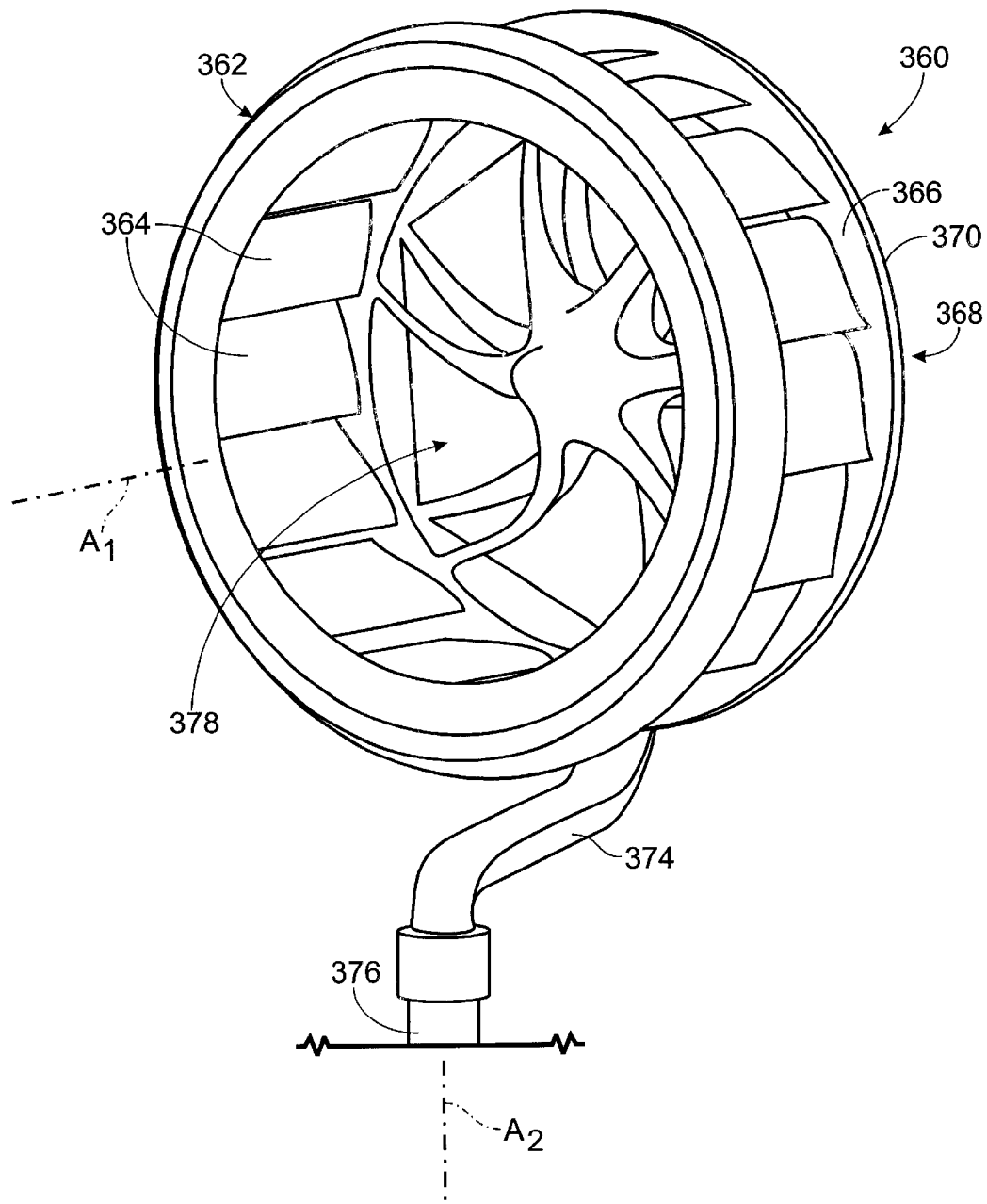

FIG. 26 is a front, perspective view illustrating, in a somewhat isolated fashion, yet another modified wind-turbine system featuring the present invention. This drawing is on about the same scale as that used in FIG. 6A.

Figure 27:
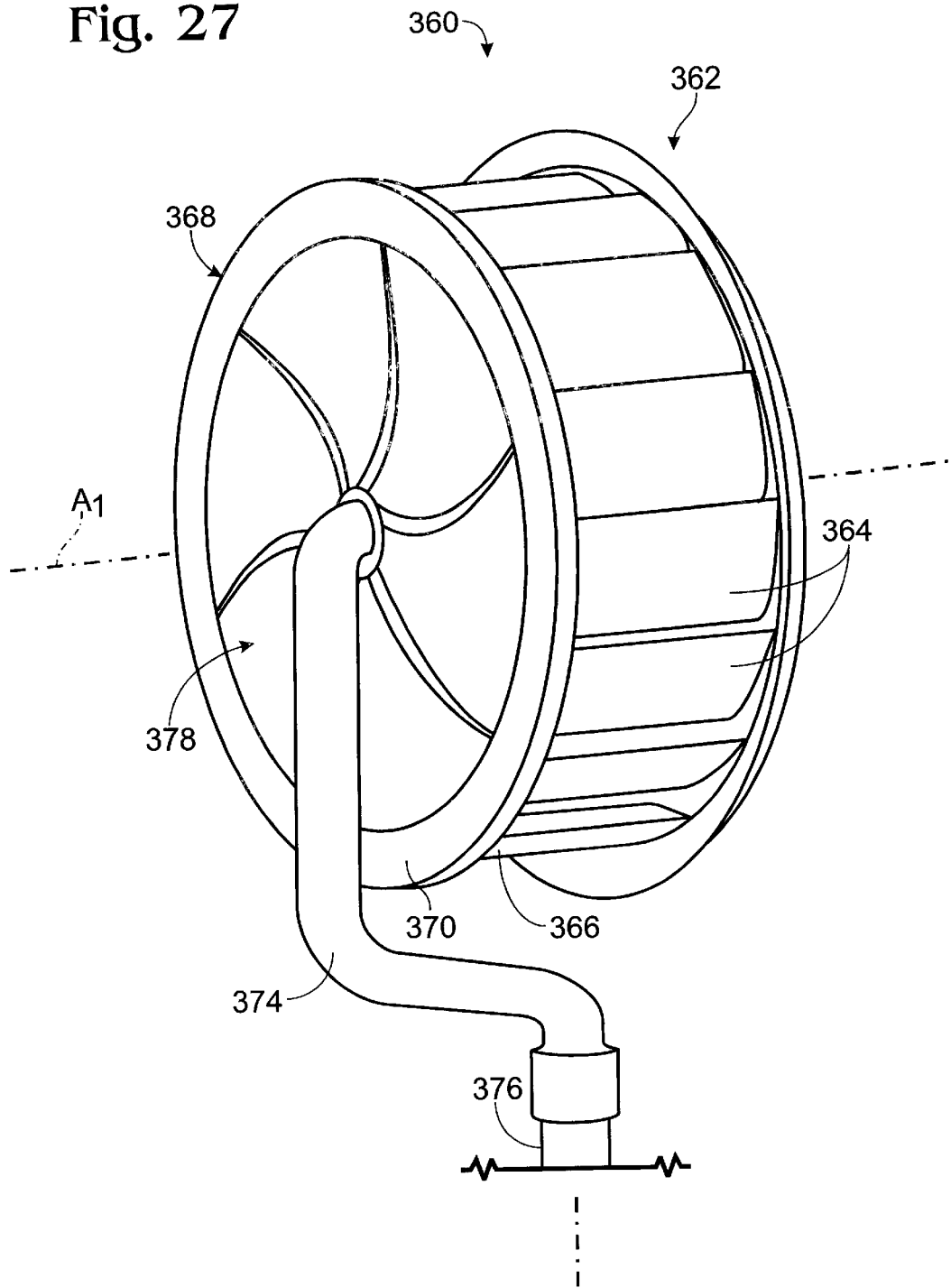

FIG. 27 is a rear, perspective view of the system of FIG. 26.

Figure 28:
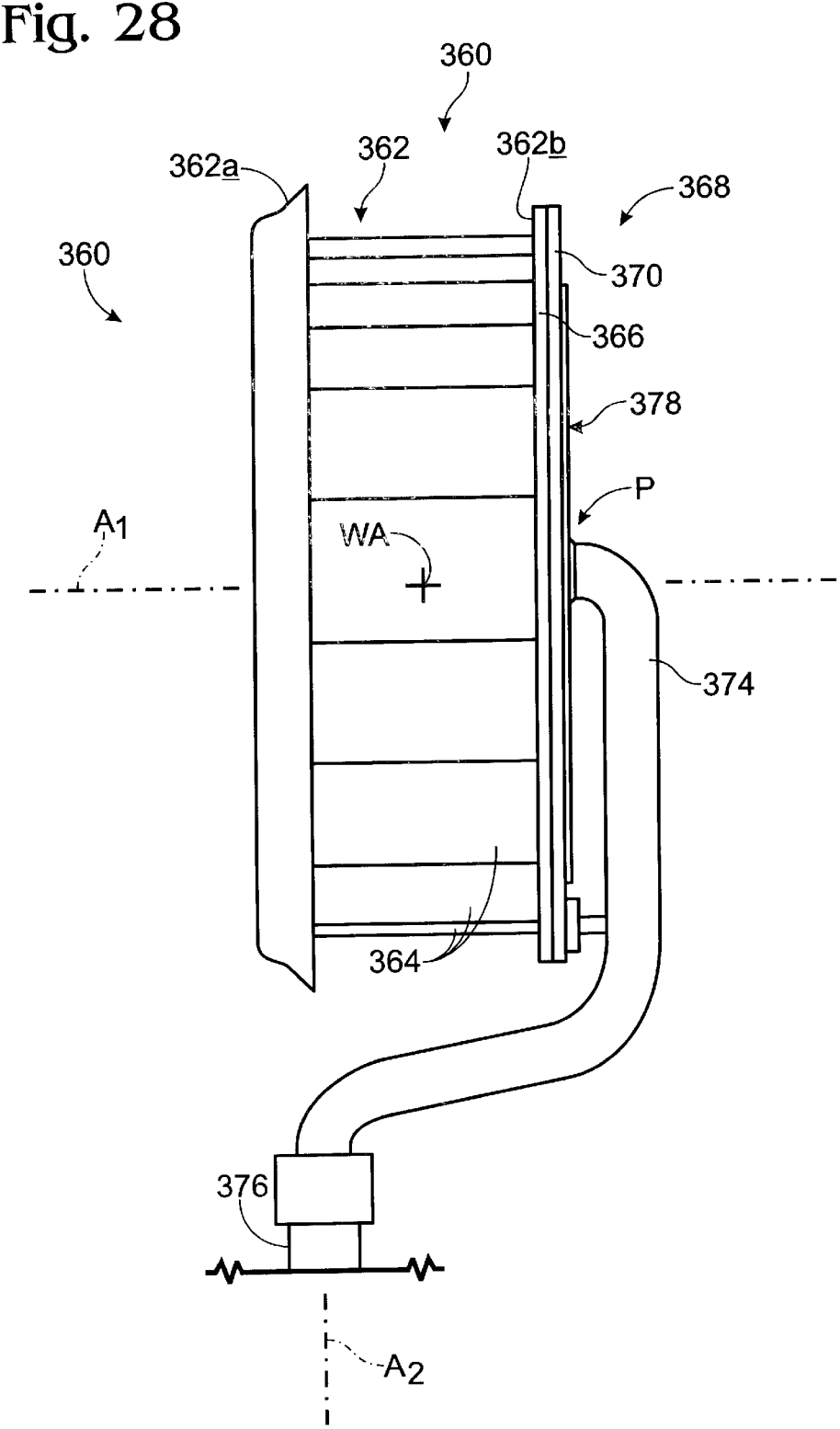

FIG. 28 is a side elevation taken generally from the right side of FIG. 26.

Figure 29:
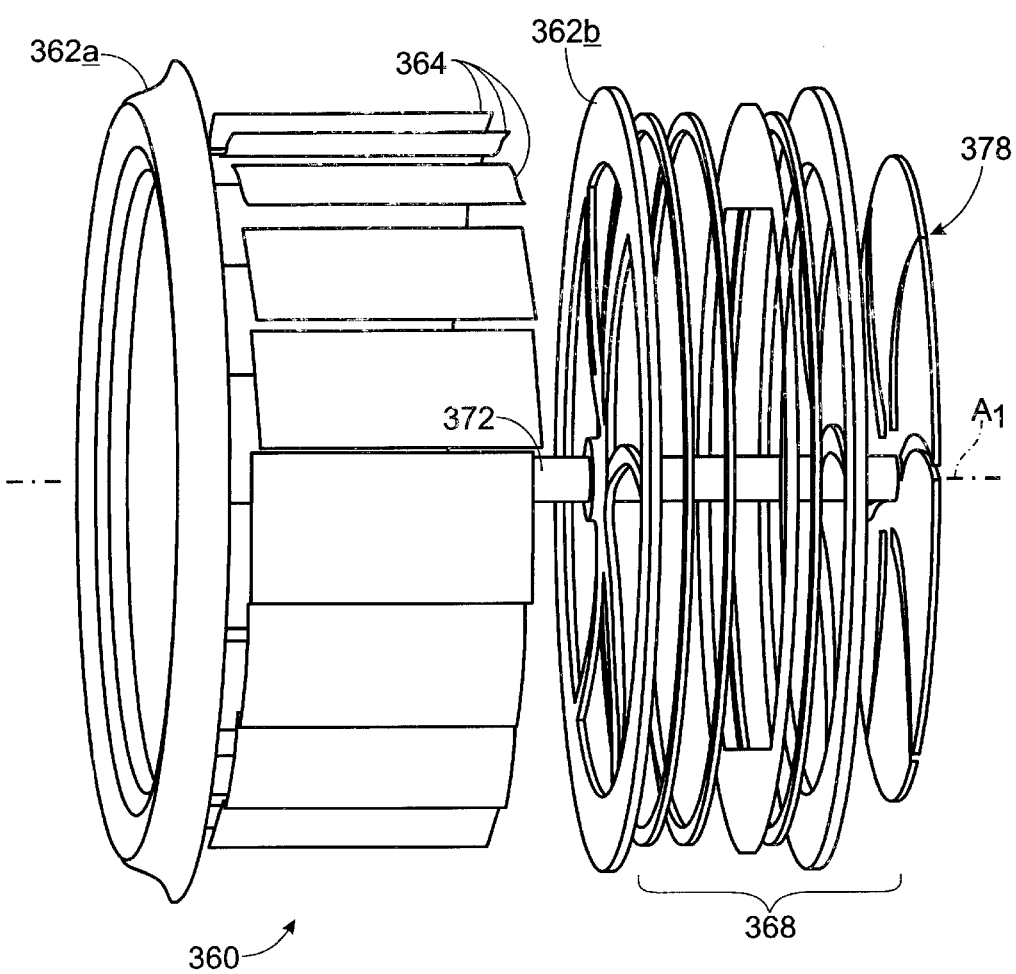

FIG. 29 is a simplified, perspective, exploded view illustrating various components which make up the integrated rotor/generator employed in the system of FIGS. 26, 27 and 28.

Figure 30:
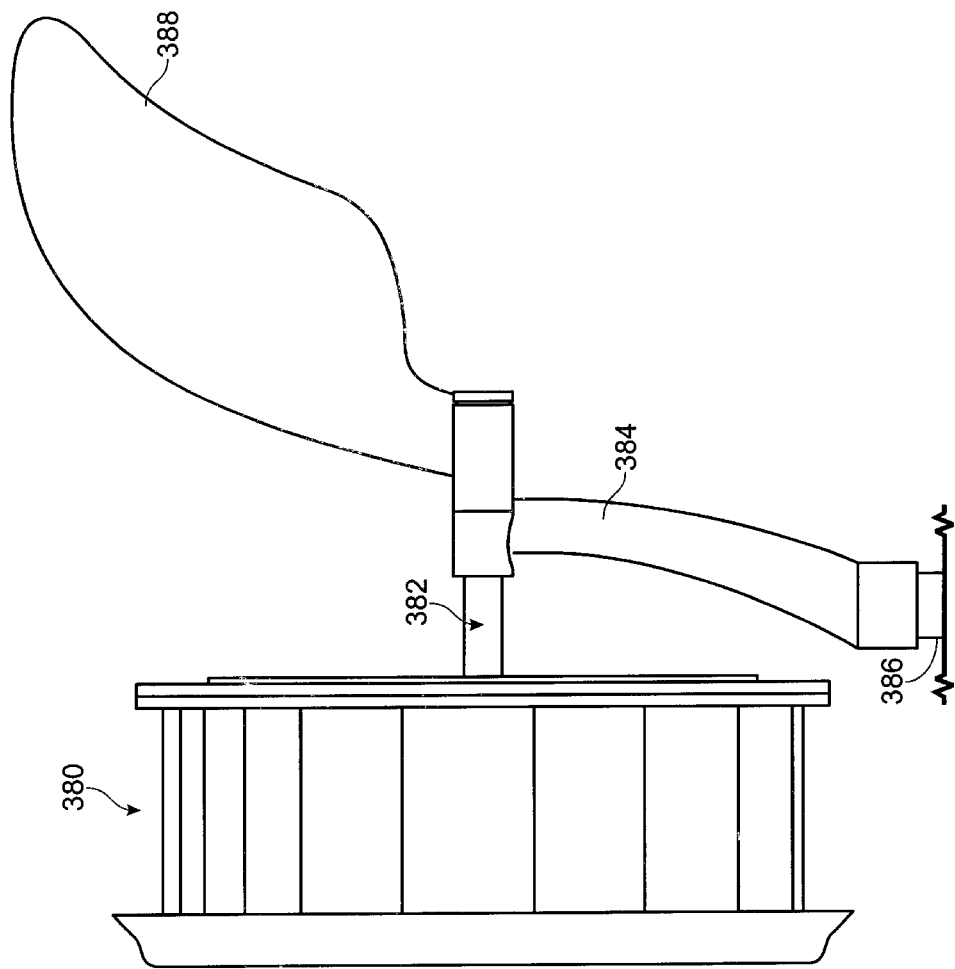

FIG. 30 is a view which is similar to that presented in FIG. 28, except that it shows (a) a modified rotor support structure, and (b) a modified wind vane which has the same functionality as the wind vane illustrated in FIG. 10.

Figure 31:
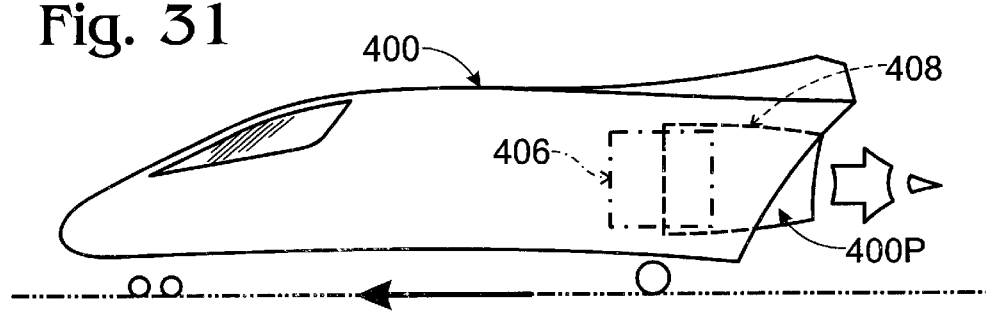
Figure 32:
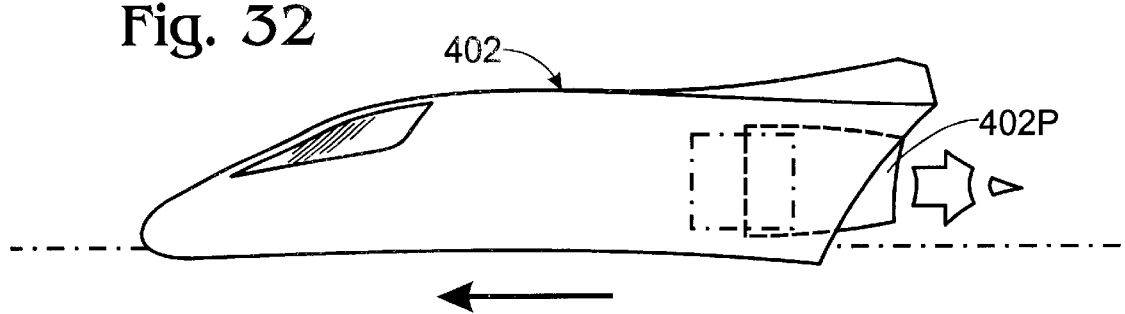
Figure 33:
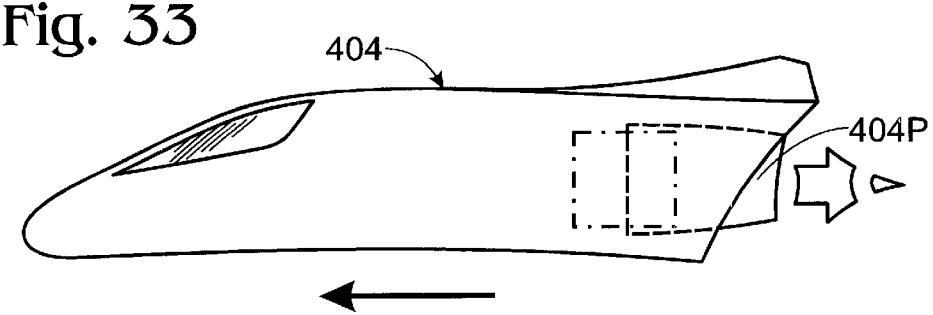

FIGS. 31, 32 and 33 are simplified, schematic side elevations depicting, respectively, a ground-transport vehicle, a water-transport vehicle, and an air-transport vehicle, each employing a "reverse-performance" embodiment of the present invention.

DETAILED DESCRIPTION OF THE INVENTION

By way of preliminary exposition, very little about specific details of construction of the system of this invention, and of its several components, is required in order for one of ordinary skill in the art to understand how to make and use the invention. Rather, the construction of the system of this invention can involve, simply, appropriate assembly, and cooperative integration, of otherwise individually-conventional elements, each of which elements can be implemented in varieties of well-known ways. Accordingly, such details, which themselves form no claimed part, or parts, of the present invention, are omitted herein.

Figure 5A:
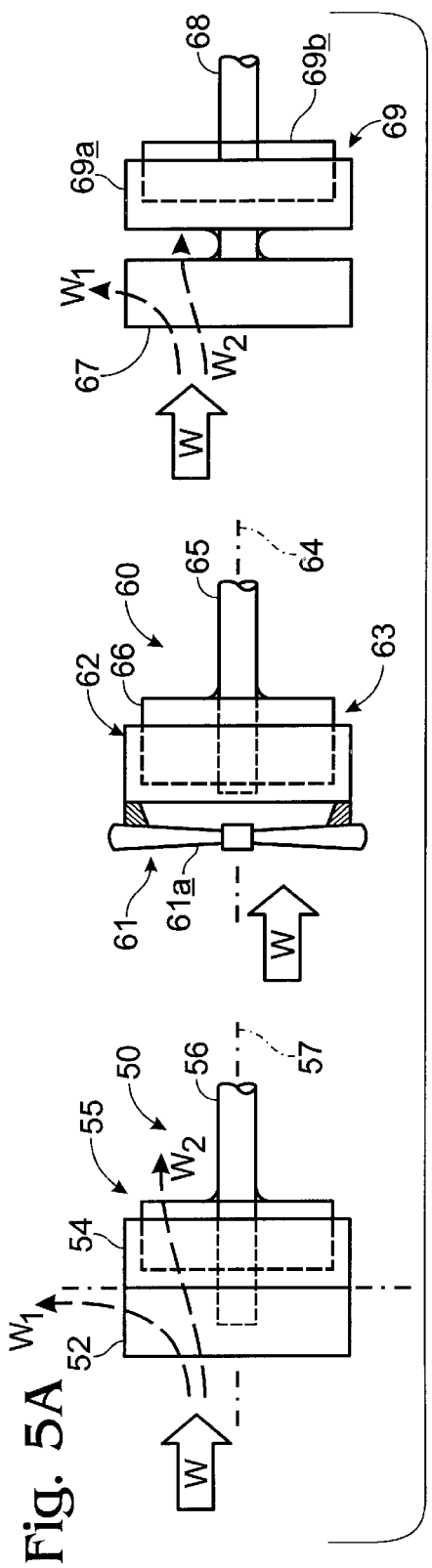
FIG. 5A illustrates, for the purpose of general preliminary exposition and comparison, and in simplified, schematic/block form, side elevations of three different (upper, middle and lower views) preferred structural renditions (embodiments) of portions of a novel wind-turbine system proposed by the present invention. If these three views are considered alternatively in a "reverse-operation" sense of thinking, they can function as several illustrations of an integrated system which converts electrical power to fluid-flow power. Each of these system embodiments is referred to herein generally as an annular, power-hand-off, power-transduction system.

Thus, and turning now to the drawings, and with reference made initially, and particularly, to FIG. 5A, this figure illustrates, in a vertical stack, and as noted earlier, three different renditions, or realizations (embodiments), of the structural arrangement proposed by the present invention.

The upper view in FIG. 5A pictures such an embodiment at 50. This embodiment includes an integrated rotor/generator having a hoop-type, aerodynamic rotor 52 which is coupled perimetrally to the rotor 54 in an electrical generator 55. Rotors 52, 54 act mechanically as a unit with one another, and are suitably commonly journaled (by bearings not illustrated) on a stationary shaft 56 for rotation about their commonly shared longitudinal axes of symmetry, which axes are also common, or coincident with, the system's rotational axis shown at 57. Axis 57 lies in the plane of FIG. 5A. Rotors 52, 54, as viewed along axis 57, say from the left side of the view-portion of FIG. 5A now being discussed, have a generally circular/annular appearance.

Suitably mounted on and anchored to shaft 56 is a somewhat hoop-shaped stator 58 in generator 55. Stator 58 has a somewhat cylindrical shape (as viewed along axis 57), and extends axially inwardly into the right side of rotor 54 in this top view. Shaft 56 is suitably supported on, and over, the nearby underlying ground in a manner permitting the left side of rotor 52 in this drawing figure to face, generally, the direction of oncoming wind W, which in this view, flows from the left to the right.

This top view in FIG. 5A illustrates what is referred to herein as the most preferred form of the present invention, wherein a hoop-type, aerodynamic rotor couples generally in an annular, rim-to-rim, perimetral fashion to rotor 54, with the power transfer that resultingly takes place between these two rotors occurring without requiring the use of any rotating, coupling shaft. Rotors 52, 54 herein collectively constitute a spool, with each rotor effectively defining, or forming, one perimetral end of the spool. The wind-facing, left end of this spool in the figure is referred to hereinalso as an open end.

The middle view in FIG. 5A illustrates, partially, an integrated rotor/generator system 60 constructed in accordance with another embodiment of the present invention. In this embodiment, a propeller-type, or fan-type, aerodynamic rotor 61 is employed having plural, radially-extending blades, such as blade 61a, anchored near their outer ends, and in any suitable fashion, to the perimeter of the left side of an electrical rotor 62. Rotor 62 forms part of an electrical generator 63. Rotors 61, 62 are suitably journaled on a stationary shaft 65, through bearings not shown, for rotation about an axis 64. Shaft 65 is very much like previously-mentioned shaft 56, in that shaft 65 does not rotate, and is suitably supported on and above the underlying ground in a manner (still to be described) permitting the blades, and rotor 61, to face oncoming wind W, which in this view, as in the top view discussed above, flows from the left to the right in the view. Also forming part of generator 63 is a stator 66, somewhat hoop-like in construction, with this stator extending axially into rotor 62 from the right side of that rotor as pictured in this view.

The lower-most view presented in FIG. 5A partially illustrates a third embodiment of the system of the present invention, which system embodiment employs a hoop-like aerodynamic rotor 67 which is anchored to a rotating shaft 68. Shaft 68 is supported for rotation, through suitable bearings (not shown), on an appropriate ground-support structure (still to be discussed). This ground-support structure supports the FIG. 5A—pictured components of this system embodiment in a manner allowing rotor 67 to face oncoming wind W, in much the same manner as was described with respect to previously-mentioned rotors 52, 61.

Also anchored to shaft 68, for rotation along with the shaft, is a hoop-like electrical rotor 69a which forms part of an electrical generator 69. Generator 69 also includes a stator 69b which is suitably anchored for non-rotation relative to the ground. Stator 69b extends axially inwardly into the right side of rotor 69a (as such is pictured in the lower view in FIG. 5A).

The upper and middle views in FIG. 5A thus illustrate embodiments of the present invention wherein no rotating shaft is employed, and wherein mechanical power, which can be thought of as rotating mechanical power, is coupled (handed-off, or transferred) between the respective aerodynamic rotors and the respective, associated electrical generator rotors, in what is referred to herein as an annular, perimetral, rim-to-rim fashion. These integrally combined rotors constitute a generally annular, contiguous cylindrical wall in what is also referred to herein as a revolution structure according to this invention. As pictured in these two views, the combined rotor construction includes an open front (left) end, and a generally closed back (right) end. The system illustrated in the lower-most view in FIG. 5A, as was true with respect to the other two embodiments pictured in this figure, includes an integrated rotor/generator structure wherein a rotating shaft is employed as the mechanical coupling agency acting between the aerodynamic rotor and the generator rotor.

In each of these three embodiments, power that is derivable from an oncoming and existing fluid-flow of wind: (1) is captured in a generally circular, cross-sectional area; (2) is converted to mechanical rotation; (3) is delivered mechanically from the aerodynamic structure to the rotor in an electrical generator; and (4) from there on out, exits the components shown in FIG. 5A as an electrical output which is handled in a manner that will be described shortly. Conditions of "excess" wind, and how these are handled, will be discussed later in this document. In each of the two, upper-view embodiments in FIG. 5A, captured fluid-flow (wind) power is gathered in an annular, rotating perimetral region for delivery to the perimetral rim in the respective, associated electrical generator rotor. The system shown in the lower-most view of FIG. 5A, utilizing hoop-type aerodynamic rotor 67, gathers and concentrates wind-derived power for delivery via shaft 68 directly to the rotor in an electrical generator structure.

Figure 5B:
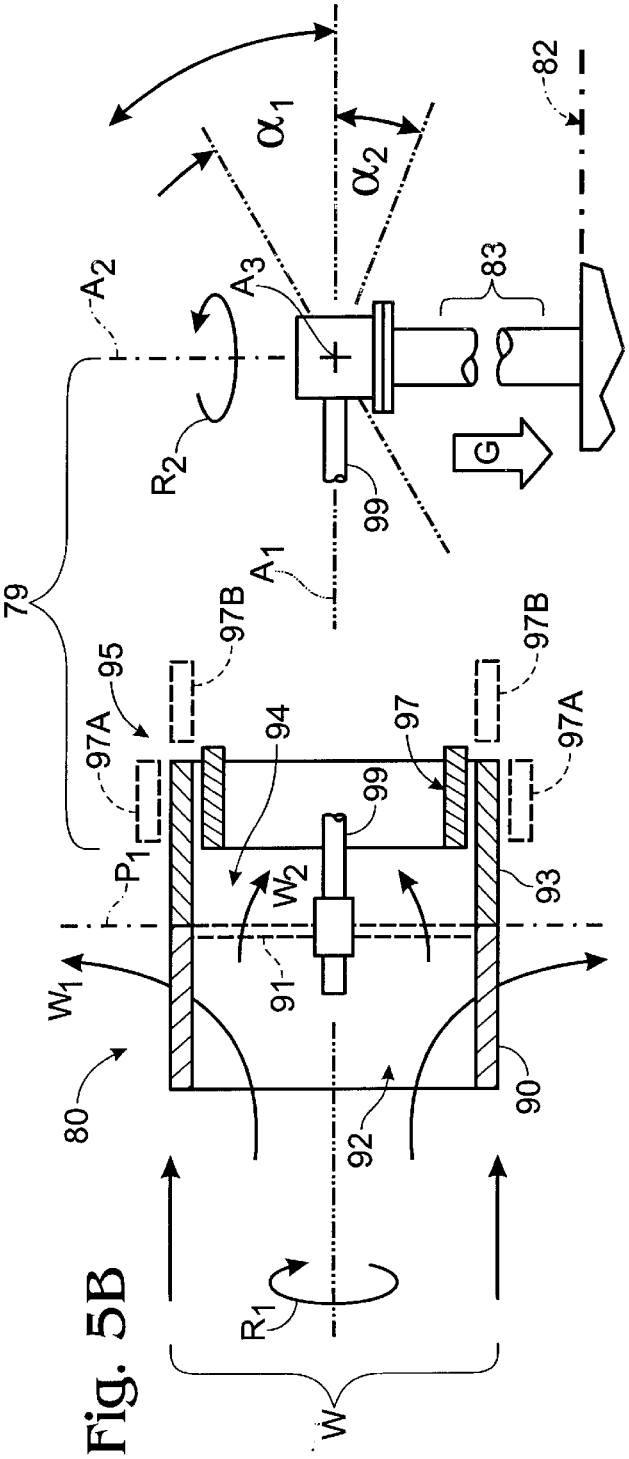
FIG. 5B is a simplified, and fragmentary, schematic diagram (somewhat more detailed) of the system embodiment which is generally pictured in the upper view in FIG. 5A. This system is here illustrated with visual reference made in the figure to certain axes, angles and directions that are referred to below in the detailed specification.

Focusing attention now specifically to the contents of FIG. 5B, and moving on with a fresh parts-reference-number series of numbers, this figure illustrates, in very simple, schematic-layout fashion, a preferred, wind-turbine embodiment 79 of the invention (the same embodiment pictured in the upper view of FIG. 5A). FIG. 5B also illustrates, more fully, several directions, axes, rotations and angles that characterize this invention and its operation.

Previously mentioned wind W is directed toward a front, open side (left side in FIG. 5B) of an "integrated" aerodynamic rotor 80 (which forms the rotating portion of system 79), thereby causing rotor 80 to rotate as indicated at $R_1$ around a rotor axis $A_1$. The meaning of the term "integrated" will be further discussed shortly. Axis $A_1$ will typically be substantially parallel to the ground 82, and should be substantially in parallel with the wind direction W. Another important rotational axis $A_2$, also called herein a vertical support axis, is generally parallel to gravitational direction G, perpendicular to ground 82, and perpendicular to rotor axis $A_1$. Axis $A_2$ is also referred to both as a "wind-seeking axis", and as a "primary support axis". Axis $A_2$ is generally defined by the particular support structure, such as support structure 83, which is employed to support rotor 80 and other components of the wind-turbine system which may be oriented along or relative to axis $A_1$. Depending on the direction of wind W, axis $A_1$ is free to rotate as indicated at $R_2$ around axis $A_2$ so that the front face of rotor 80 is optimally positioned to receive wind W. A third axis $A_3$ (which is substantially normal relative to each of axes $A_1$, $A_2$) may be provided for allowing selected "vertical" angulation of rotor 80, as indicated by angles $\alpha_1$, $\alpha_2$, to assure that axis $A_1$ substantially parallels the surface of the underlying ground. Preferably, a downwardly and forwardly inclined angle, such as angle $\alpha_1$, or an upwardly and forwardly inclined angle, such as angle $\alpha_2$, is adjusted, created and "locked" into the system for all future operations substantially at the time that a system, such as system 79, is installed for use.

Considering now in somewhat greater detail the components and construction of system 79 (including certain modifications of this system), and referring now to FIGS. 6A, 6B, 6C, 6D, 6E$_1$, 6E$_2$, 6E$_3$, 6E$_4$, 7, 8A and 8B along with FIG. 5B, system 79 (as has been already mentioned) takes the form of an embodiment of the present invention wherein a hoop-shaped, or squirrel-cage-type, aerodynamic rotor is coupled in a rim-to-rim, perimetral fashion directly to the rotor in an electrical generator. This coupling exists, according to the invention, without there being any intervening, rotating drive shaft. Accordingly, rotor 80 can really be thought of as being a rotor assembly which includes an aerodynamic rotor, and additionally, a rotor which forms a part of the electrical generator just mentioned. Such twin-rotor descriptive language will be employed variously from hereon in this specification. Rotor assembly 80, therefore, is referred to herein as including a hoop-shaped, or squirrel-cage-type, aerodynamic, generally cylindrical rotor 90 which has an open front end 92 for receiving wind W, and an axially opposite, normally generally closed, back end 94. The long axis of rotor 90 is coincident with rotational axis $A_1$.

Rotor 90 may be constructed in a number of different specific ways, several of which are illustrated and described more particularly shortly herein, with this rotor including what is referred to as a generally circular, disc-shaped back door structure 91 generally at the location of, and occupying, a plane $P_1$ (which plane is generally normal to axis $A_1$). As will be explained, this back door structure is selectively openable and closeable (via angularly distributed, adjustable openings) relative to permitting the axial through-flow of wind, preferably in response to impinging wind velocity, to direct, under substantially all operating circumstances, the most appropriate volume of wind flow radially outwardly (as will be explained) the periphery of rotor 90.

The rear perimeter rim portion of rotor 90 is joined very directly, and in what is referred to herein as a perimetral, rim-to-rim fashion, with the periphery of a rotor 93 which forms the rotating-component portion of an electrical generator shown generally at 95 in FIGS. 5B, 7 and 8A. The stator of generator 95 is illustrated generally at 97, is received within the inside of rotor 93, and is suitably anchored to a shaft 99 which supports the entirety of generator 95 and of all portions of rotor assembly 80. Shaft 99 is a fixed, non-rotating shaft, suitably anchored to the top portion of previously mentioned support structure 83.

Not shown specifically in FIG. 6A, but pictured fragmentarily in FIG. 6B, is an aerodynamic, wind-deflection "nose-cone" 100. Preferably, this cone "end-caps" (at location 100A in FIG. 6A) the central, axial, wind-facing structure inside rotor 90.

Rotor 90 has a plurality of air foils, such as air foils 96, distributed around the periphery of the hoop-like structure. Rotor 90 herein is constructed with sixteen air foils (all visible schematically in FIG. 6C, but not all in FIG. 6A)—sixteen being one of several specific numbers of foils which have demonstrated superior performance. Another observably interesting number of foils, for example, is eighteen (see FIG. 6D). Other specific numbers of foils may also be selected. Wind W is received through open end 92 of rotor 90, and then is directed out through the periphery of rotor 90, between air foils 96, thereby imparting rotational movement to rotor 90 around rotary axis $A_1$.

A way of envisioning and describing the organization of foils 96, as the same are pictured in FIG. 6A, is that the long, generally straight foils each has its long axis extending in a plane which also contains rotational axis $A_1$. In particular, each such long axis also substantially parallels axis $A_1$.

Focusing special attention now on what appears in FIGS. 6E$_1$ and 6E$_2$, and "borrowing" for use in these two figures certain ones of the component reference numerals employed in FIG. 6A, aerodynamic rotor 90 here has a generally truncated, frustro-conical configuration, and contains an appropriate number (for example, sixteen) of elongate air foils 96 which are disposed with their long axes lying in planes that reside at oblique angles of "wind-flow attack" relative to rotation axis $A_1$. The rotor pictured in these two figures is in the general hybrid category mentioned above which has both fan-like and squirrel-cage-like qualities.

With regard to how FIGS. 6E$_1$, 6E$_2$ are employed herein to illustrate the present invention, these two figures are used, variously, to show three different modifications which reside, generally, in two different categories. One category involves a construction wherein the foils are essentially fixed for all time in defined positions relative to one another in the aerodynamic rotor, and the reader should, accordingly, keep this constructional alternative in mind. The other category involves the presence of moveable, articulated foils, and FIG. 6E$_2$ is especially designed to picture two different foil-articulation arrangements.

The open end of rotor 90 is indicated at 92. The rotor's opposite end is perimetrally, drivingly coupled to electrical rotor 93 in generator 95 (this generator, and its two main components, are shown only in FIG. 6E$_1$). Rotor 93 confrontingly and closely faces electrical stator 97 in this generator, in a pancake-like fashion. Rotors 90, 93 are coupled without there being any intervening rotating shaft.

The entire rotating assembly of these FIG. 6E$_1$-pictured components is journaled on stationary support shaft 99, and stator 97 is appropriately nonwovingly joined to this shaft. Following this "path of connectivity" all the way to the underlying ground (not shown), shaft 99 is affixed to the top of upright support structure 83, and the latter is suitably anchored to the ground. The point of "above-the-ground" direct support connection P thus provided for the aerodynamic rotor and for the electrical generator, is located generally where structure 83 and shaft 99 join. This point of connection, one should especially note, is located rotationally-axially outwardly relative to the combined aero-electrical-generator assembly. This is important to observe. This is one of the many innovations contributed to the art by the present invention in the setting of a system which is constructed without the presence of a rotating shaft interposed the aerodynamic rotor and the generator rotor.

The center of gravity of the system shown in FIG. $6E_1$ acts (gravitationally) along the line designed CG, and this line is spaced by a distance D from the upright support axis in support structure 83. The overall axial length of the system components which are carried on shaft 99 is indicated at $L_A$, and the overall axial length of the pancake-like generator in this system is indicated at $L_a$. As one can readily see, $L_a$ is a small fraction of $L_A$, and this situation contributes to the utility of having the entirety of the system components that are illustrated in FIG. $6E_1$ disposed entirely to one axial side of the point of ultimate (above-ground) support connection of the system with support structure 83.

In the particular FIG. $6E_1$-embodiment of the present invention, all system components displayed therein are, in fact, entirely to one side only of the upright support axis of support structure 83. In other embodiments, the above-ground-supported system components may extend on opposite sides of this axis. One specific modified form of the invention wherein such "opposite-sides" positioning exists is pictured in FIGS. 26, 27 and 28. This modification will be discussed later herein.

Staying with, for a moment, and walking now back through, this FIG. $6E_1$-structure, while there may well be many instances and applications where foils 96 remain locked in place relative to one another—and this "locked-in-place" condition should be understood to define that categorical form of a system mentioned above as one wherein the foils are "fixed" in the aerodynamic rotor—an interesting, and potentially very significant, "other kind" of organization is one wherein the foil are mounted for movement relative to one another in the aerodynamic rotor.

We turn now with particular reference to FIG. $6E_2$ which shows two representative styles of realizing such "other-kind" opportunities. Here, and let us first address this matter with very specific reference to what is shown schematically and fragmentarily in the left-side portion of FIG. $6E_2$, foils 96 are suitably mounted in a manner permitting selective, preferably infinitely controllable, reversible, circumferential, "sliding-like" motion relative to one another about axis $A_1$.

This motion is suggested by the double-ended, curved arrow which is designated 94. Such motion effectively expands and contracts the sizes of the distributed spaces that, by intentional aerodynamic design, lie between the various pairs of adjacent foils, thus to change, accordingly and simultaneously (a) the percentage of instantaneous impinging wind which is used to create rotation (and thus to furnish usable power), and (b) the related, "remaining" impinging-wind percentage which is allowed to bypass the aerodynamic rotor, thus to avoid a potentially damaging wind-overload condition.

The right-side portion of FIG. $6E_2$ shows an arrangement wherein each (although less than all could be used) foil is hinged along one of its generally axially-extending sides in the aerodynamic rotor to permit selective, preferably infinitely controllable, flap-like hinged motion, toward and away from axis $A_1$. This kind of motion accomplishes essentially the same general kind of wind-percentage dividing-activity described in the preceding paragraph herein, and in addition, functions to alter effective foil angle of attack as another subtle control over wind-power extraction.

Foils 96, as pictured in FIGS. $6E_1$ and $6E_2$, are long, straight structures, and each is disposed with its long axis both (a) lying in a plane which is also occupied by rotational axis $A_1$, and (b) intersecting axis $A_1$ at an angle which is other than a right angle (i.e., acute). This "acute" intersection angle opens toward (or faces) the wind-facing side of rotor 92 (the left side in FIG. $6E_1$).

FIGS. $6E_3$, $6E_4$ show yet another modified form of aerodynamic rotor 90 which exhibits the earlier mentioned hybrid behavior of being both somewhat fan-like, and also somewhat squirrel-cage-like.

In these two drawing figures, air foils in aerodynamic rotor 90 are essentially straight and linear in construction, and are suitably mounted in place adjacent opposite axial ends of the rotor with their long axes extending at oblique angles (the angles are the same for each foil) relative to rotational axis $A_1$. For three of these foils, and for descriptive and illustrative purposes herein, the long axes of these three respective coils are indicated in FIG. $6E_3$ by lines 96a, 96b, 96c. As these three foil axes are pictured in FIG. $6E_3$, it will be seen that the opposite ends of these axes, within the aerodynamic rotor structure, terminate at connection points within the rotor which are angularly displaced from one another relative to rotation axis $A_1$, and as one would "see" these lines appearing in an axial view of the aerodynamic rotor, such as the view presented in FIG. $6E_3$. Because of this situation, it will be clearly understood, and this situation is generally pictured in FIG. $6E_3$, that the foils themselves, as the same are viewed along the rotation axis of the rotor, extend across the generally circular "space" which is circumscribed by the perimeter of the rotor. Such being the situation, it will be clear that impinging wind which, within the hollow interior of the rotor has a vector component that generally parallels axis $A_1$ (into the plane of FIGS. $6E_3$), will strike portions of the surfaces of the air foils, and thus will contribute to power-capturing within a system employing this kind of rotor.

FIG. $6E_4$ generally pictures previously mentioned long axes stretches 96a, 96b, 96c, and additionally, pictures, at W in this figure, vector wind of the type just generally mentioned. In FIG. $6E_4$, the front, wind-receiving side of the rotor is generally labeled $R_f$, and the opposite axial side of the rotor is indicated at $R_f$. The wind-receiving side of rotor 90 is shown also with the designator $R_f$ in FIG. $6E_3$.

Returning for a moment to what is shown in FIG. $6E_3$, and for the purpose of understanding a bit more about the functionality of an aerodynamic rotor constructed as pictured here, the nominal through-passage inside diameter of the rotor is generally pictured at $D_1$. The effective inside diameter of the rotor, i.e., that diameter which describes what could be thought of as a through-flow passage that exists as a consequence of the angular mountings of foils 96, is indicated in FIG. $6E_3$ at $D_2$. Shading which is provided in a portion of FIG. $6E_3$ which appears between concentric circles that have the just-mentioned diameters $D_1$ and $D_2$, effectively illustrates the added air foil available area which is engageable for power collection purposes by impinging wind, in the sense of power capturing occurring in relation to wind impingement vectors which parallel axis $A_1$.

Further considering a way of describing the orientations of the long, straight foil axes in the structure pictured in FIGS. $6E_3$ and $6E_4$, these axes, such as labeled long axis $96a$, $96b$, $96c$, neither (a) parallel rotational axis $A_1$, nor (b) lie in a plane which also contains axis $A_1$. Put another way, and within the organizational context just expressed, each such long axis lies in a plane which substantially parallels a plane that separately contains axis $A_1$.

In each of the system embodiments described herein, wherein position-(attitude)-adjustable fluid-flow foils are employed, a certain percentage portion of engaged wind is effective to produce rotation, and the "balance" percentage portion substantially "bypasses" the system. These percentage portions vary with attitude-positional changes occurring in, and with respect to, the foils.

Other details and structures relating to the category of hoop-type rotors, such as rotor 90, are described in U.S. Pat. No. 4,781,523, issued on Nov. 1, 1988, U.S. Pat. No. 5,425,619, issued on Jun. 20, 1995, and U.S. Pat. No. 5,591,004, issued on Jan. 7, 1997, each of which patents names Elmo E. Aylor as the inventor. Each of these patents is hereby incorporated by reference.

Turning attention now particularly to FIG. 7, and further discussing previously mentioned system 79, also included in this system, on the electrical-output-side of generator 95, is a power-electronic control circuit, or structure, 108, whose function, which is an otherwise conventional function, will be mentioned shortly. Since aerodynamic rotor 90 (which is shown with fixed, straight foils whose long axes substantially parallel rotation axis $A_1$) and generator rotor 93 are connected and integrated with each other, it is unnecessary for shaft 99 to rotate, and this "elimination" of an interconnecting, rotating shaft also eliminates the stress and fatigue problems which occur with rotating shafts in the prior art. Thus, the design illustrated in FIG. 7 also eliminates the requirement for using shaft 99 as a torsion transfer mechanism between aerodynamic rotor 90 and generator rotor 93.

With system 79 operating under a "normal" condition, in the presence of a velocity-varying wind-flow, generator 95 produces variable-voltage, variable-frequency electrical power. This variation-containing power is controlled and converted conventionally by circuit 108 to a standard utility voltage and frequency which is delivered to a conventional utility grid, as indicated by arrow 110. As was suggested earlier, conversion could also be performed so as to deliver power to some other kind of "recipient" of controlled electrical power. The specific design of, and componentry employed within, circuit 108 may take any one of a number of well known and well understood, conventional constructions (i.e., such as constructions of this nature often found in variable-speed, power-electronic drives provided for industrial motors). Accordingly, details of this circuit are not presented here.

FIG. 8A elaborates, slightly, the integrated rotor-generator system 79 organization pictured in FIG. 7. In this figure, rotor structure 80 is opened up to show general interior construction, and other features. Here, stator 97 is seen clearly nested within generator rotor 93. Passage routes for wind W are illustrated by arrows $W_1$, $W_2$, with arrow $W_1$ illustrating radial outward wind-flow past air foils 96, and arrow $W_2$ illustrating longitudinal, "escape" wind-flow (as needed) through back door structure 91. (See also FIG. 5A, top and bottom views, and 5B). Greater detail about the make-up and operation of structure 91 will follow shortly.

Journal mechanisms 112 are shown (see FIGS. 8A, 8B) supporting the entity of rotor structure 80 for rotation on stationary shaft 99. Generator stator 97 is shown anchored, as, for example, by welding at 114, on shaft 99.

In the embodiment of the system which has been discussed so far in relation to FIGS. 5B, 7 and 8A, an organization has been shown with the generator stator nested and received within the generator rotor. Dashed lines 97A and 97B in FIG. 5B show two alternative generator configurations. In particular, dashed lines 97A (two dashed, elongate blocks) show a generator with its stator wrapping around rotor 93, and dashed lines 97B (another two dashed, elongate blocks) show a generator with its stator positioned laterally outwardly of, and slightly away from, the right end of rotor 93 in FIG. 5B.

FIG. 8C shows another embodiment of an integrated rotor-generator system 132. System 132 is the same as rotor-generator system 79 of FIG. 8A, except that the relative axial positions of the aerodynamic rotor and of the generator rotor portion are switched. System 132 has an electrical generator with a rotor portion 134 in front (i.e., forwardly located for direct engagement with wind), and a circumsurrounding stator portion 135. The back perimetral, annular side of the "hollow" rotor in generator portion 134 is integrally connected, in a perimetral, rim-to-rim fashion, to an aerodynamic, hoop-like rotor portion 136. Generator rotor portion 134 and aerodynamic rotor portion 136 are supported by a stationary support shaft 137 which is held in an orientation generally arallel to the direction of wind W by ground-support structure 138. Illustrated generally at 139 is a "wind-escape" back door structure that occupies a plane $P_2$.

FIGS. 9A and 9B are similar to FIGS. 8A and 8B, respectively, except that a propeller-type aerodynamic rotor is used instead of a hoop-type, or squirrel-cage-type, rotor. FIG. 9A shows a side view of an integrated rotor-generator system 140. A propeller-type aerodynamic rotor 142 has its blades 142a integrally connected with the rotor 143 in a direct-drive electrical generator 144. These blades are connected, as by welding (at locations such as those shown at 141), to the forward-end perimeter of the generator rotor, and the blades extend, as can be seen, radially outward from a central, rotary hub 145 to receive and respond to oncoming wind W. Such response, of course, results in rotational movement of rotor 142 around rotary axis $A_1$, and as a consequence, and because of the direct connection existing with the generator rotor, in like rotational movement of the generator rotor. These two rotors turn together, therefore, as a single unit.

A nonrotating, stationary shaft 148, which is equivalent to the several stationary shafts already mentioned, functions to support integrated rotor-generator system 140, but is not required to transfer torque, or to rotate relative to axis $A_1$. Primary ground-support structure 150 allows rotor-generator 140 to rotate, or swing, about primary support axis $A_2$ according to changes in wind direction W. As previously discussed with respect to earlier-described systems, electrical power produced by generator 144 is controlled and converted by a power-electronic control circuit 152 before delivery to a grid (arrow 153).

FIG. 9B shows a front view of rotor-generator system 140.

FIG. 9C shows a modified embodiment 156 of a fan-blade-type, integrated rotor-generator system. Rotor-generator system 156 employs aerodynamic rotor fan blades, such as blades 158, which extend in radial directions but which are not connected to a central hub. Blades 158 are directly connected, as by welding at locations such as those shown at 159, to the forward-end perimeter of a squirrel-cage-type electrical rotor 160 which forms part of an electrical generator 161. Rotor 160 rotates around axis $A_1$.

The embodiment illustrated in FIG. 9C thus further demonstrates the lack of necessity for a rotating shaft.

The same principles discussed above in relation to an integrated squirrel-cage, or propeller-type, rotor can be applied to numerous other types of aerodynamic rotors. For example, vertical-axis integrated rotor-generators can be designed and produced by integrating direct-drive generator rotors with known vertical-axis aerodynamic rotors, such as (1), a Savonius-type rotor, such as is disclosed and described in U.S. Pat. Nos. 1,766,765 and 4,838,757, and (2), a Darrieus-type rotor, such as is disclosed and described in U.S. Pat. Nos. 1,835,018 and 4,449,053. Each of these four patents is hereby incorporated herein by reference.

Directing attention now to FIG. 10, here there is shown, generally at 168, a wind-vane structure which is used to create passive alignment, with the wind-flow direction W, and about axis $A_2$, the rotary axis $A_1$ of the aerodynamic rotor portion 172 of an integrated rotor-generator system 170. System 170 is, in most other ways, the same in construction as previously discussed system 79. Included in system 170, and forming at least a part of the mentioned wind-vane structure, is an elongate wind vane 176 which extends behind the integrated rotor-generator part of system 170. Specifically, wind vane 176 is suitably anchored so as to move about primary support axis $A_2$, and as a unit with the generator stator portion 174 of an electrical generator 175, in response to changes in wind direction W. The rotor portion of the generator is indicated at 177. Such a wind-direction-shaft-response causes stationary, nonrotating shaft 178 to swing around axis $A_2$, so that wind W is optimally directed toward and into the front-end opening 180 of aerodynamic rotor portion 172. Such "seeking of the wind" performance is, of course, a function of the fact that what can be thought of as the "center of action" (lateral action) of the combined structure pictured in FIG. 10 is on the opposite side of axis $A_2$ relative to the integrated aerodynamic rotor/generator structure.

Amplifying briefly on the thought, expressed earlier, that the particular electrical generator design employed can readily involve different general rotor/stator configurations, and recognizing that details of all such configurations may be conventionally implemented, suffice it to say that many different rotor/stator arrangements can be employed, so long as each of these arrangements accommodates ready, direct coupling to an aerodynamic rotor, and easy and uncomplicated mounting, preferably on a stationary, nonrotating shaft, such as shafts 56, 65, 68, 99, 137, 148, 178.

Notwithstanding the recognized fact that various, different, specific design approaches may be used for an electrical generator appropriate for use in the realization of the present invention, FIGS. 11, 12, 13, 14, 15A, 15B and 15C generally illustrate several considered approaches (a few, overall, configurational possibilities, and some internal details).

FIGS. 11, 12, for example, illustrate one preferred construction for an electrical generator rotor 186 usable in a rotor-generator system like that pictured in, and discussed with respect to, FIGS. 5A (all views), 5B, 7, 8A, 8C, 9A and 10. As has already been explained, such an electrical generator rotor is directly connected to, and rotates as an integrated assembly with, the associated aerodynamic rotor. Preferably, the nominal diameters of these two joined rotors are substantially the same. Both the generator rotor and the aerodynamic rotor will operate in such a setting at, or near, optimal efficiency. No speed-increaser is required.

As shown in FIG. 11, rotor 186 includes a ring-like, outer rim 188 which is made of a suitable magnetic steel. Rim 188 provides structural support for other components in rotor 186, and additionally, furnishes an appropriate coupling, magnetic flux path. An inner ring 190 is bonded to outer rim 188, which inner ring 190 takes the form of plural, spaced, permanent magnet segments, such as segments 192. Conventionally, segments 192 are arranged circumferentially with alternating N-S polarity (see the enlarged, fragmentary view presented in FIG. 12). $R_r$ is the inside radius of curvature of rotor 186.

FIGS. 13, 14 relate specifically to FIGS. 11, 12, respectively, and show a non-rotating, ring-like electrical generator stator 194 positioned inside rotor 186. Rotor 186's inside radius $R_r$ is slightly larger than stator 194's outside radius $R_s$, thus to furnish the usual, required airgap 198. Rotor 186 and stator 194 form a concentric and coaxial pair of rings with a common center on axis $A_1$—a construction which clearly "fits well" in the overall constructional setting of the preferred embodiment of the present invention. Stator 194, as illustrated herein, includes two, joined, outer and inner ring-like structures 200, 206 respectively. Outer ring structure 200 is formed from laminations of a suitable magnetic steel which are fabricated with slots/pockets, such as those shown at 202, to carry appropriate stator windings, such as windings 204.

The generator structure thus generally described and illustrated in FIGS. 11–14, inclusive, may be built, as those skilled in the relevant art will recognize, to perform either as a single-phase, or as a plural-phase, machine.

FIGS. 15A–15C illustrate, very generally, several, additional, alternative electrical generator configurations. FIG. 15A shows a schematic cross-section through an integrated rotor-generator 220, which is a version of the alternative construction mentioned with respect to dashed lines 97A in FIG. 5B. Here, an aerodynamic rotor 222 is connected to an associated generator rotor 224. A stator 226 is positioned externally around the circumference of rotor 224. In operation, rotors 222, 224 rotate around axis $A_1$ as an integrated unit in response to oncoming wind W. Stator 226 remains stationary relative to axis $A_1$.

FIGS. 15B, 15C show two more examples of general integrated rotor-generator arrangements involving a generator's rotor and stator relative dispositions. In FIG. 15B, a squirrel-cage-type aerodynamic rotor 232 is shown connected to a generator rotor 234. Here, as distinguished from the somewhat axially-elongate, cylindrical, generator rotors so far discussed, rotor 234 takes the form generally of a flat (planar, pancake-like), annular disk. The associated stator, shown at 236, is also formed generally as a flat (planar, pancake-like), annular disk, and is positioned in a spaced, facially confronting (right side of the rotor in FIG. 15B) relationship with respect to rotor 234.

Similarly, in FIG. 15C, a squirrel-cage-type, aerodynamic rotor 242 is shown connected to a flat, annular (planar, pancake-like) generator rotor 244. Rotor 244 is sandwiched between two, spaced, cooperative stator components 246, 248.

As a brief side note here—and as a reminder of thoughts presented earlier—and to quell any possible residual wonderings about design constraint, the showings herein of "squirrel-cage type" rotors having generally cylindrical side walls is not intended to place any special, or limiting, focus on side-wall cylindricality. Such "cage" side walls could have any one of a number of different shapes, such as truncated-conical, bulging (or bowed) convexly outwardly or inwardly, circumferentially segmented, and many others.

FIGS. 16–25, inclusive, illustrate embodiments of the invention relating to an important aspect of a hoop-type, or squirrel-cage-type, aerodynamic rotor—any style. Describing this invention aspect with an aerodynamic rotor such as the one shown in FIG. 6A. Referring back to FIG. 6A, wind W enters open front end 92 and ultimately encounters back panel and door assembly 91 which effectively functions to redirect wind-flow radially outwardly (see W₁) through the periphery of rotor 90 between air foils 96. It is, of course, such wind-flow past the air foils which extracts usable kinetic energy from the wind, and converts it to rotating mechanical power which turns the integrated aerodynamic and generator rotors.

At normally expected wind speeds, it is desirable for back panel and door assembly 91 to be mostly, or totally, closed. However, at extremely high wind speeds, such as hurricane-force winds, the system may not be capable, without there being available some form of highly responsive, wind-force relief, of withstanding such high wind forces without catastrophic consequences—for example, collapse and destruction of the rotor and its support system. Therefore, it is important to design and utilize a back door system which provides variable opening of the back panel as a function of wind force.

FIG. 16 illustrates very generally another back panel and door assembly 270. Assembly 270 includes a generally circular back panel 272 which is formed with a plurality (eight in the structure illustrated in FIG. 16) of openings, such as the four openings pictured at 272a, 272b, 272c, 272d, and a plurality of back door elements, such as the four elements pictured at 274a, 274b, 274c, 274d. The openings thus illustrated in panel 272 are substantially equally angularly spaced, are circumferentially distributed around axis A₁, and are somewhat pie-shaped. The door elements mentioned are preferably formed (with the shape, somewhat, of radiating petals of a flower) in a single, generally disc-shaped blank 280 (see FIG. 17) which is made of a material, such as fiberglass, metal, plastic, rubber, etc. Blank 280, and its contained "petals" (which are the previously mentioned door elements), is suitably secured, near a hub 276, axially symmetrically, and face-to-face contiguously located, with respect to panel 272.

In a "relaxed" state for blank 280, the respective door elements each substantially closes off (against wind passage) a different one of the openings in panel 272. In response to wind pressure rising above a certain (pre-selected) level, these elements passively bend/pivot/swing about axes, such as axis 278 which is related to panel 274a, to open up the associated openings, such as opening 272a, in panel 272, thus to permit the escape of wind axially through the system, and thus to help avoid a catastrophic damage, "over-wind" situation. Such pivoting/swinging/opening action, of course, occurs effectively via the operations of integral "living hinges", or hinge structure, which exist in blank 280.

Evident from the description just given is the fact that back panel and door assembly 270 is quite simple in construction, particularly when compared to the back door system disclosed in previously mentioned U.S. Pat. No. 5,425,619.

Numerous variations of back panel and door assemblies are possible. For example, as suggested in FIG. 16, the pivot line utilized by a door element can be changed to lie along a generally radial line, such as is indicated at B, or along a near-outer-circumference, tangential line, such as is indicated at C. Also, different blanks with their contained door elements can have different spring coefficients, i.e., different opening profiles as a function of wind force.

FIG. 18A shows a schematically drawn cross-section through back door element 274a. Here, element 274a is shown with a uniform thickness along its radial length. The thickness of element 274a is selected, at least in part, to achieve the desired hinging or bending performance in response to wind force. Alternatively, it may sometimes be advantageous to vary the flexibility of a back door element along its length. As shown in FIG. 18B, stiffening layers, such as those shown at 275a, 275b, may be mounted on back door element 274a to create such a varied flexibility profile. Stiffening layers may also be useful to dampen vibration of the back door elements. Controlled flexibility of element 274a along its length can also be achieved by graduating the thickness of the element, as shown in FIG. 18C.

FIG. 19 is a schematic cross-sectional view of a back door element sheet 281 which is mounted on an aerodynamic rotor 282 in such a fashion that it responds to a wind-overload situation (W) by bending backwardly over the generally convex surface of a central hub element 283, which, thus, effects positive control over the sheet's bending response.

In addition to avoiding mechanical damage and failure in high winds, the back door structures proposed for use in the system of the present invention also can be used and tuned to reduce fluctuation in turbine rotary speed due to changing wind speed. This can have the positive result of decreasing variability of voltage and frequency output from the related system's electric generator.

FIG. 20 shows a graph generally plotting a back door opening area A as a function of wind force F. The graph shows that, in a low wind regime, changes in wind force cause relatively small changes in the degree of back door opening. However, in a high wind regime above threshold X, relatively small changes in wind force cause large changes A in the degree of back door opening.

FIGS. 21A through 23B illustrate another type of back door system for a hoop-type, aerodynamic rotor—this one employing a sliding screen arrangement. As shown in FIG. 21A, a back door assembly 300 employs two sliding screens, namely, a front screen 302 defining four openings, such as opening 304, and a back screen 306 (dashed lines) defining openings, such as opening 308. Openings 308 in back screen 306 are slightly larger than openings 304 in front screen 302. A wind sensor 310 associated with this back door system detects wind force, and transmits wind force data to an actuator 312. Actuator 312 determines, and then effects, the desired degree or extent of back door opening, and causing rotation of either front screen 302 or back screen 306 relative to each other. In FIG. 21A, maximum back door opening is achieved by aligning openings 304 of front screen 302 with openings 308 of back screen 306.

FIG. 21B is a side view of front screen 302 and back screen 306 of back door system 300.

FIGS. 22A–23B illustrate, schematically, open and closed conditions for two, different sliding-screen back door systems. In FIG. 22A, a front screen 320 is adjusted relative to a back screen 322 so that all back door openings are closed. In contrast, FIG. 22B shows the same front screen 320 and back screen 322, with the screens rotated relative to one other to create maximum opening of back door apertures 324.

FIGS. 23A, 23B show a three-screen sliding back door system which permits a greater extent of total back door opening in the fully open condition. In FIG. 23A, a front screen 330, a middle screen 332 and a back screen 334 are rotated relative to each other so that the associated back door apertures 336 are closed. The same screens are shown in maximally open conditions position in FIG. 23B, where front screen 330, middle screen 332 and back screen 334 are lined up with each other in order to maximize the areas of openings 336. FIGS. 23A, 23B illustrate the point that increasing the number of sliding screens allows a greater maximum extent of back door opening in a sliding-screen-type back door arrangement.

FIG. 24 illustrates very schematically the possibility of providing a sliding-screen-type back door structure which is passive (i.e., directly wind responsive). Here there is shown a screen member 340 which includes openings, such as opening 342, and a relatively deflectable/rotatable, second screen member 344 which includes portions, such as portion 344a, that can be deflectingly (downward in FIG. 24) and rotationally (to the left in FIG. 24) adjusted to close, and variably open, such openings. In solid lines in this figure, portion 344a is illustrated schematically in a condition more nearly closing opening 342, and in dashed lines, at 344b, this same portion (344a) is shown in a condition more fully opening opening 342. The force of wind W causes portion 344a to "drive" (for example) against the sloping cam wall 346a of an appropriate cam structure 346 which is mounted on, or adjacent, the rear (lower in FIG. 24) face 340a in screen member 340. Readers skilled in the relevant mechanical arts will understand from this general "schematic" description how to employ such a "cam-influenced", wind-force-responsive, type of back-door structure.

Another type of back door system is illustrated in FIG. 25. Here there is illustrated a back door system 350 which is formed of an elastomeric sheet material 352 having a small central opening 354 and radial slits 356. Elastomeric sheet 352 is suitably clamped near its circular, outer, peripheral edge 358. Wind impinging on back door system 350 causes individual segments of sheet 352 to bend and deform backward out of their resting-plane, collectively causing an effective increase in the central aperture dimension to release variably excessive wind power.

FIGS. 26–29, inclusive, generally illustrate at 360 an integrated rotor/generator system constructed in accordance with the present invention which differs a bit from the other system structures discussed above. System 360 includes a squirrel-cage-type aerodynamic rotor 362 which is equipped with plural air foils, such as foils 364, with this aerodynamic rotor coupled to the rotor 366 in a pancake-like generator 368 which also includes a stator 370.

FIG. 29 is a somewhat exploded view illustrating the front and rear angular support rings 362a, 362b, respectively, in rotor 362, the previously mentioned air foils 364, and an exploded cluster of very thin (axially) somewhat ring-like components that make up previously mentioned generator 368. The integrated aerodynamic rotor/generator assembly is carried, without the presence of any rotating shaft, on a fixed shaft 372 which is suitably anchored to a somewhat L-shaped support arm 374 that is carried on top of an upright support structure shown generally and fragmentarily at 376. Also included in the structure illustrated in these figures is an adjustable back door assembly 378 of any suitable design.

As can be seen especially well in FIG. 28, one will observe that the direct support connection point P between arm 374 and the aerodynamic rotor/generator structure is located clearly to one axial side (the right side pictured in FIG. 28) of this rotor/generator structure. As can also be seen in this figure, the center of wind action (that is, lateral wind action) of the kind mentioned earlier is pictured at WA in FIG. 28. This center of action is on the opposite side of upright axis $A_2$ relative to the wind-facing side of the structure which is the left side thereof in FIG. 28.

FIG. 30 illustrates a system 380 constructed in accordance with the present invention with this system including an integrated rotor/generator structure which is essentially exactly the same as that pictured in FIGS. 26–29, inclusive. This rotor/generator structure, an integrated structure, is supported on a stationary shaft 382 which is anchored to the top of a slightly bowed support arm 384 that is carried on top of an upright support structure 386.

An upwardly extending, tail-like wind vane 388 is provided (as shown) to give structure 380 the kind of wind-seeking behavior generally discussed above.

One matter which is especially interesting to note in relation to systems 360, 380 is that the overall axial length of the entire assembly, including the aerodynamic rotor and the pancake-like generator, is significantly greater than the total axial dimension of the generator. This is especially well seen in FIGS. 28, 30.

In FIGS. 31–33, inclusive, three stylized and very simply illustrated (one in each figure) streamlined vehicles are shown at 400, 402, 404, respectively. Vehicle 400 represents a ground-transport vehicle, vehicle 402 a water-transport vehicle, and vehicle 404 an air-transport vehicle. Vehicles 400, 402, 404 are equipped with power-drive systems 400P, 402P, 404P, respectively, which are constructed in accordance with appropriate, reverse-performance features (mentioned earlier) of the present invention. Each power-drive system, also referred to herein as a fluid-flow propulsion system, converts electrical power to air-flow power to furnish forward propulsion (to the left in FIGS. 31–33, inclusive) for vehicles 400, 402, 404.

A brief description of the fundamental components in system 400P will serve to describe the like components which are found in systems 402P, 404P. Thus, system 400P includes an electromagnetic prime mover 406 having a magnetic-field-coupleable stator and a relatively rotatable rotor (like stators and rotors in such a device as earlier described herein), and a fluid-flow propulsion rotor 408 which is suitably drivingly connected to the just-mentioned prime-mover rotor.

The invention which has thus been exemplified above in the context principally of wind turbines, has, as has just been illustrated, many other applications. The integrated rotor-generator may be employed advantageously in all sizes and power ratings of electricity-generating wind turbines. Additionally, the invention may be viewed more generally as useful for converting fluid-flow to mechanical rotation and electrical power. For example, the integrated rotor-generator can be applied to underwater or other liquid applications. The invention may also be applied "inversely" in relation to the wind turbine examples discussed above. Specifically, the system of this invention may be used for the conversion of electrical power to fluid-flow power, such as in electrically-driven fans for moving fluids and for use in a vehicle propulsion applications.

We claim:

1. A system for converting wind power to electrical power comprising an elongate, unitary revolution structure having a long axis, and a rotational axis which is coincident with said long axis, said revolution structure being rotatable about said rotational axis in response to incident, impinging wind, said revolution structure including, adjacent one end, a rotary, aerodynamic air-foil assembly responsive directly to said wind to produce rotation of the revolution structure, and adjacent the other end, axially offset relative to said air-foil assembly, and forming a part of an electrical-power-generating assembly, an electromagnetic-generator rotor joined to said air-foil assembly for rotation as a unit with the same, operable, in response to rotation produced by said air-foil assembly, to effect the generation of electrical power, said air-foil assembly and said rotor being operatively joined without there being any intermediate, central, rotary coupling shaft extending therebetween.

2. The system of claim 1, wherein said revolution structure further includes a change-configuration, wind-barrier structure generally occupying a plane which is (a) intermediate said air-foil assembly and said rotor, and (b) generally normal to said rotational axis, said wind-barrier structure being changeable, effectively in response to incident, impinging wind velocity, to modify its configuration in such a manner that it presents, to such wind, more of a barrier to the through-flow of wind (relative to the wind-barrier structure) under circumstances with relatively low wind velocities than it does under circumstances with relatively higher wind velocities.

3. The system of claim 2, wherein said wind-barrier structure includes a generally circular, disc-shaped member with angularly distributed openings which are distributed around said rotational axis, and change-position door structure including, for each said opening, a door expanse operatively connected to said disc-shaped member, each said door expanse being adjustable between one position generally closing its respective, associated opening, and another position more greatly exposing that opening for the through-flow of wind.

4. The system of claim 3, wherein each said door expanse is infinitely adjustable between its said one and its said other positions.

5. The system of claim 4, wherein said wind-barrier structure further includes cam structure operatively interposed said disc-shaped member and said door structure, said cam structure functioning to effect adjustment of said door expanses automatically in response to changes in wind velocity as experienced by said expanses.

6. The system of claim 4, wherein each said door expanse is adjustable by swinging toward and away from the plane generally occupied by said wind-barrier structure.

7. The system of claim 6, wherein each said door expanse is integral with said disc-shaped member, joining the same via hinge structure.

8. The system of claim 4, wherein said door expanses are adjustable by shifting angularly generally in a plane substantially paralleling the plane of the wind-barrier structure.

9. A system for converting wind power to electrical power comprising a rotary, aerodynamic air-foil assembly having a rotational axis, said assembly being directly and rotationally responsive to incident, impinging wind, and an electromagnetic-generator assembly including a rotor joined to, and axially offset from, said air-foil assembly for rotation as a unit with the same about said rotational axis, directly driveable in rotation by the air-foil assembly (a) in the presence of incident, impinging wind, and (b) without the rotary use of any intermediate, central coupling shaft extending between the air-foil assembly and the rotor, and an electromagnetic-generator stator operatively connected magnetically to said rotor for coacting with the same to produce electrical power when the air-foil assembly rotates.

10. The system of claim 9 which further includes a rotary, change-configuration, wind-barrier structure operatively connected to said air-foil assembly and to said rotor, and generally occupying a plane intermediate the two, which plane is generally normal to said rotational axis, said wind-barrier structure being changeable, effectively in response to incident, impinging wind velocity, to modify its configuration in such a manner that it presents to such wind more of a barrier to the through-flow of wind (relative to the wind-barrier structure) under circumstances with relatively low wind velocities than it does under circumstances with relatively higher wind velocities.

11. The system of claim 10, wherein said wind-barrier structure has a generally circular, disc-shaped member with angularly distributed openings which are distributed around said rotational axis, and change-position door structure including, for each said opening, a door expanse operatively connected to said disc-shaped member, each said door expanse being adjustable between one position generally closing its respective, associated opening, and another position more greatly exposing that opening for the through-flow of wind.

12. The system of claim 11, wherein each said door expanse is infinitely adjustable between its said one and its said other positions.

13. The system of claim 12, wherein said wind-barrier structure further includes cam structure operatively interposed said disc-shaped member and said door structure, said cam structure functioning to effect adjustment of said door expanses automatically in response to changes in wind velocity as experienced by said expanses.

14. The system of claim 12, wherein each said door expanse is adjustable by swinging toward and away from the plane generally occupied by said wind-barrier structure.

15. The system of claim 14, wherein each said door expanse is hinged to said disc-shaped member through hinge structure which is more closely adjacent said rotational axis than is the periphery of the disc-shaped member.

16. The system of claim 15, wherein each said door expanse is integral with said disc-shaped member, joining the same via hinge structure.

17. The system of claim 16, wherein said door expanses are adjustable by shifting angularly generally in a plane substantially paralleling the plane of the wind-barrier structure.

18. The system of claim 9, wherein air-foil assembly is hoop-shaped.

19. The system of claim 9, wherein said air-foil assembly is propeller/fan-shaped.

20. A system for converting fluid-flow power to electrical power comprising an elongate, generally squirrel-cage-like, rotary spool journaled for rotation on and about the long axis of a central, stationary, non-relatively-moveable support shaft, or the like, said spool including a fluid-dynamic foil assembly which is located on, and which generally defines, one perimetral end of said spool, and an axially offset electromagnetic-generator rotor which is located on, and which generally defines, the opposite perimetral end of the spool, and an electromagnetic-generator stator extending into said spool's said opposite end, magnetically and operatively coupled to said rotor.

21. A system for converting wind power to electrical power comprising an elongate revolution structure having a long axis which is also its rotational axis, and which is mounted for rotation on and about said rotational axis, said revolution structure including an elongate, generally annular, cylindrical wall, one end of which is formed with an aerodynamic air-foil assembly for responding to incident, impinging wind flow directed substantially along said long axis to produce rotation of the revolution structure, and an axially offset electromagnetic-generator rotor forming the opposite end of said wall, and an electromagnetic-generator stator operatively and magnetically coupled to said rotor adjacent said opposite end of said wall.

22. A direct-drive system for converting wind power to electrical power comprising a wind-power-responsive unit having a rotational axis, and including an aerodynamic rotor which rotates under the influence of wind power contained in a flow of incident, impinging wind, and an electrical-power-generating assembly including a rotor directly coupled in an axially offset manner to the rotor in said wind-power-responsive unit without the use of any rotary shaft, said second-mentioned rotor being operable, at the same rotational speed as said wind-power-responsive unit's said rotor, for converting such rotation to electrical power.

23. The system of claim 22, wherein said aerodynamic rotor has a generally circular appearance as the same is viewed along said rotational axis, and includes plural, elongate, generally circumferentially spaced and distributed air foils, said air foils being disposed with their long axes each extending within a plane which also contains said rotational axis.

24. The system of claim 23, wherein each said long axis intersects said rotational axis at an angle which is other than a right angle.

25. The system of claim 24, wherein said aerodynamic rotor has a wind-facing side, and the region of intersection between each said long axis and said rotational axis includes an acute angle which generally faces said side.

26. The system of claim 22, wherein said aerodynamic rotor has a generally circular appearance as the same is viewed along said rotational axis, and includes plural, elongate, generally circumferentially spaced and distributed air foils, said foils being disposed with their long axes each lying in no plane which also contains said rotational axis.

27. The system of claim 26, wherein each said long axis lies within a plane which is spaced from, and which parallels another, different plane that contains said rotational axis.

28. The system of claim 23, 24, 25, 26, or 27, wherein said foils are positionally adjustable relative to one another and also relative to said rotational axis.

29. The system of claim 22 which further comprises ground-support structure that supports the combination of said wind-power-responsive unit and said electrical-power-generating assembly (1) above the ground, and (2) for swinging about an upright wind-seeking axis, and wherein said wind-power-responsive unit includes a wind-facing side, and the combination of said wind-power-responsive unit and said electrical-power-generating assembly includes exposed, lateral, wind-engageable surface area (having a center-of-wind action location) which acts substantially as the sole instrumentality in said system for utilizing incident, impinging wind to swing said combination about said wind-seeking axis in a manner tending to maintain said wind-facing side in a position confronting oncoming wind flow.

30. A system for converting wind power to electrical power comprising a wind-power-responsive unit including a generally annular and hollow, cylindrical, aerodynamic rotor having perimetral rim structure, which rotor rotates under the influence of wind power, and an electrical-power-generating assembly including a generally annular and hollow, cylindrical rotor which is axially offset relative to said aerodynamic rotor, and which has a perimetral rim structure drivingly connected, in a rim-structure-to-rim-structure manner, to the rim structure in said wind-power-responsive unit's said aerodynamic rotor for rotation of said assembly's rotor, on a one-to-one basis with, and at the same rotational speed as, said wind-power-responsive unit's said rotor, and for converting such rotation to electrical power.

31. A system for generating electrical power from wind power comprising an aerodynamic rotor which is rotatable around a central rotational axis, a support structure including an elongate shaft having a central long axis which is in line with said rotational axis, which support structure is for supporting the rotor with the aerodynamic rotor being free to rotate around the rotational axis while the shaft remains stationary relative to that axis, and a direct-drive electrical generator including a generator rotor which is axially offset relative to said aerodynamic rotor, and which is connected to the aerodynamic rotor so that wind impinging the aerodynamic rotor causes the aerodynamic rotor and the generator rotor to rotate around the rotational axis at the same speed while the shaft remains stationary relative to the rotational axis.

32. The system of claim 31, wherein said aerodynamic rotor is hoop-shaped.

33. An apparatus for generating electrical power from wind power comprising a substantially barrel-shaped power-conversion device having a substantially open front end for receiving wind, and a back end, the device being rotatable around a central rotational axis adaptably oriented in the direction of wind travel, wherein the device includes an aerodynamic rotor section adjacent the open front end of the device, and an axially offset direct-drive generator section adjacent the back end of the device, and wherein the aerodynamic rotor section is substantially contiguous with the generator section, so that the entire device rotates as a single integrated unit in response to wind power directed toward and through the open front end of the device.

34. A power conversation system having a rotation axis, and comprising a wind-responsive instrumentality operable and effective to extract power from wind and to produce and concentrate such extracted power in the form of mechanical rotational power gathered in a zone (relative to the system's rotation axis) which occupies an elongate, hollow, annular, generally cylindrical (or like) space, a mechanical-rotation-responsive instrumentality drivingly and generally annularly coupled in an axially offset disposition relative to said first-mentioned instrumentality, and adjacent one end of said zone, operable to respond to mechanical rotation produced by the first-mentioned instrumentality, and effective to convert such produced rotation into a hollow, annular, cylindrical zone (or the like) of magnetic rotational power, and a rotary-magnetic-energy-responsive instrumentality magnetically, operatively and responsively coupled to said mechanical-rotation-responsive instrumentality, effective to convert a response to such a zone of rotating magnetic power to electrical power.

35. Apparatus for converting fluid-flow power to electrical power comprising a fluid-dynamic rotor which produces, about a defined rotation axis, powered mechanical rotation from the mechanical power contained in a fluid which flows past the rotor, and an electrical generator including an electrical-generator rotor drivingly connected in an axially offset condition relative to said fluid-dynamic rotor without the presence of any intercoupling mechanical rotary shaft between the two, operable, in response to powered mechanical rotation produced by the fluid-dynamic rotor to generate electrical power.

36. Apparatus for converting wind power to electrical power comprising an aerodynamic rotor which produces powered mechanical rotation from the mechanical power contained in wind which flows past this rotor, an electrical generator including an electrical-generator rotor drivingly connected to and axially offset from said aerodynamic rotor, and an elongate, stationary shaft effectively supporting each of said two rotors through journal mechanism which, together with the shaft, promotes rotation of the two about a common rotational axis which is substantially coincident with the long axis of said shaft.

37. A method utilizing rotation for converting mechanical power present in the flow of a fluid, such as wind, into electrical power comprising at one region along a rotation axis, converting such flow-contained mechanical power into mechanical rotary power, and at another region along that same rotation axis, which other region is coaxially offset relative to such one region, converting such mechanical rotary power into electrical power, with such converting being implemented without the use of a rotating drive shaft.

38. A method of converting mechanical power present in the flow of a fluid, such as wind, into electrical power comprising converting such flow-contained mechanical power into mechanical rotary power, with such converted-to mechanical rotary power then being resident in a first, rotating, hollow, generally cylindrical, shell-like region, converting such mechanical rotary power into second-stage, magnetic-field power, with such second-stage converted-to power then being resident in a second, rotating, hollow, generally cylindrical, shell-like region which is substantially coextensive, and coaxially offset relative to, with the first-mentioned shell-like region, and converting such magnetic-field power into electrical power.

39. Apparatus, characterized by its lacking any rotating, power-transmitting shaft, for converting kinetic, fluid-flow power into electrical power comprising a kinetic power side which receives and converts kinetic, fluid-flow power into rotary, mechanical power, and an axially offset electrical power side operatively connected to said kinetic power side which receives and converts such rotary, mechanical power into electrical power.

40. The system of claim 39, wherein said sides are interconnected by a unified, hollow, generally cylindrical rotary structure.

41. A cup-shaped apparatus for converting wind power to electrical power comprising rotary, elongate, cup-wall structure including an air-foil rotor wall portion defining an open end in the structure, and an electrical-generator rotor wall portion joined to said air-foil wall portion and extending therefrom toward the opposite end of the cup-wall structure, said cup-wall structure being supported for rotation about a generally horizontal axis which can be generally aligned with the direction of oncoming wind, end-wall electrical-generator stator structure located toward said opposite end of said cup-wall structure, generally defining a base for said cup-shaped apparatus, operable in response to activity of said electrical-generator rotor wall portion to cooperate therewith in the generation of electrical power, and mechanism supporting said cup-wall structure for follow-orienting of said structure, whereby said generally horizontal axis is generally maintained in general alignment with wind flow, and with said open end generally facing oncoming wind.

42. An annular, power-hand-off, power-transduction system including a generally annular, cylindrical, power-transfer zone which is associated with a system rotation axis, and which is designed for bi-directional transduction (utilizing said zone) between fluid-flow power and electrical power, said system comprising a direction-selectable, bi-directional fluid-flow port for the selective inputting and outputting of fluid-flow power, effective and operable for the conversion of such power to and from rotary mechanical power, an axially offset direction-selectable, bi-directional electrical port for the selective inputting and outputting of electrical power, effective and operable for the conversion of such power to and from rotary mechanical power, and a mechanical-power transfer structure occupying said power-transfer zone and operatively interposed said ports, operable to transfer rotary mechanical power, bi-directionally through said zone and between said ports, said system operating, in relation to the transfer within the system of such rotary mechanical power, without the requirement for, or the presence of, a rotary power-transfer shaft.

43. A system which is operable selectively in two, different, bi-directional modes for the conversion and translation of wind power to electrical power, and vice versa, and where such conversion occurs in a rotary, hollow, annular and cylindrical zone in the system, and via the intermediary of rotating mechanical power, said system having what can be thought of as a wind-power side and an axially offset electrical-power side, each of which sides, depending on the selected operating mode of the system, may be either the input side or the output side in the system, selection of one of these power-designated sides to be the input side automatically causing the other power-designated side to be the output side, and comprising an aerodynamic rotor on said wind-power side, including annularly and cylindrically distributed air-foil vanes, an electrical generator on said electrical side, including an electrical-generator stator, and an annular cylindrical, electrical-generator rotor which is axially offset relative to, and drivingly connected to, said aerodynamic rotor, and an elongate, stationary shaft effectively supporting each of said two rotors through journal mechanism which, together with the shaft, promotes rotation of the two rotors about a common rotational axis, which axis is substantially coincident with the long axis of said shaft.

44. A method of converting fluid-flow power into electrical power comprising establishing a fluid-flow-engaging zone including a defined fluid-flow-confronting area with a defined area-perimeter, placing such zone in a position within the path of a selected flow of fluid, wherein the zone's defined fluid-flow-confronting area resides generally in an orientation with a normally planar portion of that area confronting the oncomingness of that flow, and with the latter (the flow) having a vector component of confrontation with such portion which is normal to such nominally planar portion, extracting, at a region confined substantially to a stretch of the mentioned, defined area-perimeter of such area, substantially all of the energy which is potentially gatherable (by the method of this invention) from the fluid flow that confronts such nominally planar portion, transferring, substantially solely in a transfer-action region which is immediately adjacent such defined area-perimeter, such extracted energy to a motion instrumentality, which instrumentality forms part of a motion-to-electrical-power-conversion apparatus including axially offset fluid-flow and electrical rotors, and which instrumentality moves under the direct influence of such extracted and transferred energy, and as a consequence of said transferring, effecting the ultimate outputting of electrical power.

45. Apparatus for extracting and delivering, in the form of rotating mechanical power, power derivable from the flow of a fluid, said apparatus comprising an aerodynamic power-capturing instrumentality designed to capture fluid-flow power which is gatherable from fluid flowing toward a determined cross-sectional area engaged by such flow and defined by said instrumentality, and to gather such captured power generally as mechanical power in a rotating annular zone which lies immediately adjacent the perimeter of said determined cross-sectional area, and annularly active power-transfer-and-delivery structure including delivery componentry which is operatively joined to said power-capturing instrumentality at a location (or locations) disposed immediately adjacent said perimeter and axially offset relative to said aerodynamic instrumentality, effective to deliver, to an environment which is outside of said apparatus, rotating annular mechanical power which has been gathered adjacent said perimeter by said power-capturing instrumentality.

46. A method for extracting and delivering, in the form of rotating mechanical power, power derivable from the flow of a fluid, said method comprising in a region occupied by a power-containing flow of fluid, defining a cross-sectional area engaged by such a flow, capturing energy from the portion of such flow which impinges that area, and gathering such captured power, without the use of any rotating power-transducer shaft, generally as mechanical power in a first, rotating annular zone which lies immediately adjacent the perimeter of the defined cross-sectional area, and engaging such gathered and captured power from such first annular rotating zone by a power-transfer-and-delivery structure, and through the use of that structure, delivering, to an environment external to that wherein fluid-flow power is captured, and within a second, annular rotating zone which is coaxially offset relative to the first annular zone, rotating annular mechanical power which has been gathered and made available in the mentioned rotating annular zone.

47. A system for converting wind power to electrical power comprising an elongate revolution structure having a long axis which is also its rotational axis, and which is mounted for rotation on and about said rotational axis, said revolution structure including an elongate, generally annular, surface-of-revolution wall, one end of which is formed with an aerodynamic air-foil assembly for responding to wind flow directed substantially along said long axis to produce rotation of the revolution structure, and an axially offset electromagnetic-generator rotor forming the opposite end of said wall, and an electromagnetic-generator stator operatively and magnetically coupled to said rotor adjacent said opposite end of said wall.

48. A power conversation system comprising a wind-responsive instrumentality operable and effective to extract power from wind, and to produce and concentrate such extracted power in the form of mechanical rotational power gathered in a zone which occupies an elongate, hollow, annular, generally surface-of-revolution space, a mechanical-rotation-responsive instrumentality drivingly and generally annularly coupled in an axially offset manner to said first-mentioned instrumentality adjacent one end of said zone, operable to respond to mechanical rotation produced by the first-mentioned instrumentality, and effective to convert such produced rotation into a hollow, annular, surface-of-revolution zone of magnetic rotational power, and a rotary-magnetic-energy-responsive instrumentality magnetically, operatively and responsively coupled to said mechanical-rotation-responsive instrumentality, effective to convert a response to such a zone of rotating magnetic energy to electrical power.

49. A method of converting mechanical power present in the flow of a fluid, such as wind, into electrical power comprising converting such flow-contained mechanical power into first-stage, mechanical rotary power, with such converted-to, first-stage power then being resident in a first, rotating, hollow, generally surface-of-revolution, shell-like region, at an axially offset location relative to where said first-mentioned converting takes place, converting such mechanical rotary power into second-stage, magnetic-field power, with such second-stage, converted-to power then being resident in a second, rotating, hollow, generally cylindrical, shell-like region which is substantially coextensive with, and coaxially offset relative to, the first-mentioned shell-like region, and converting such magnetic-field power into electrical power.

50. A fluid-flow to electrical power-conversion system comprising a fluid-flow power-capturing rotary fluid-foil structure having a rotation axis, an adjacent electrical generator including a generator rotor drivingly connected in an axially offset manner to said fluid-foil structure for rotation therewith on a one-to-one basis about said rotation axis, and without the existence of any interconnecting rotating shaft, and ground-anchoring support structure adapted to support said fluid-foil structure and said generator at a defined location above the ground, operatively connected to the fluid-foil structure and to the generator via a support connection which is disposed to one axial side of the combination of the fluid-foil structure and the generator.

51. The system of claim 50, wherein the connected combination of said fluid-foil structure and said generator, as viewed from a side of said rotation axis, has a lateral axial profile wherein the axial dimension of said generator is significantly smaller than that of said fluid-foil structure, and contributes a minor portion of the overall axial dimension of the contribution, and with said generator being constructed in such a way as to operate with an internal magnetic field which is defined by magnetic flux lines which substantially, and dominantly, parallel said rotation axis.

* * * * *